(12) United States Patent
Tabata et al.

(10) Patent No.: US 11,433,874 B2
(45) Date of Patent: Sep. 6, 2022

(54) CONTROL DEVICE FOR HYBRID VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Tooru Matsubara, Toyota (JP); Takahiro Kimura, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 229 days.

(21) Appl. No.: 17/025,699

(22) Filed: Sep. 18, 2020

(65) Prior Publication Data

US 2021/0086749 A1 Mar. 25, 2021

(30) Foreign Application Priority Data

Sep. 20, 2019 (JP) .............................. JP2019-172304

(51) Int. Cl.
| | |
|---|---|
| *B60W 20/15* | (2016.01) |
| *B60W 10/08* | (2006.01) |
| *B60W 40/06* | (2012.01) |
| *B60W 10/10* | (2012.01) |
| *B60W 10/06* | (2006.01) |

(52) U.S. Cl.
CPC ............ *B60W 20/15* (2016.01); *B60W 10/06* (2013.01); *B60W 10/08* (2013.01); *B60W 10/10* (2013.01); *B60W 40/06* (2013.01); *B60W 2510/0633* (2013.01); *B60W 2510/0638* (2013.01)

(58) Field of Classification Search
CPC ...... B60W 20/40; B60W 20/11; B60W 20/15; B60W 20/17; B60W 20/20; B60W 10/06; B60W 30/1884; B60W 2510/0638; B60W 2710/0661; B60W 2710/0644; B60W 2050/0096

See application file for complete search history.

(56) References Cited

U.S. PATENT DOCUMENTS

| | | | | |
|---|---|---|---|---|
| 2021/0086747 A1* | 3/2021 | Tabata | .................. | B60K 6/365 |
| 2021/0086748 A1* | 3/2021 | Tabata | ................ | B60W 30/184 |
| 2021/0086749 A1* | 3/2021 | Tabata | .................. | B60K 6/365 |
| 2021/0086751 A1* | 3/2021 | Tabata | .................. | B60W 20/15 |

FOREIGN PATENT DOCUMENTS

JP      2008247205 A      10/2008

* cited by examiner

*Primary Examiner* — George C Jin
(74) *Attorney, Agent, or Firm* — Hunton Andrews Kurth LLP

(57) ABSTRACT

When a speed difference between a maximum rotation speed and an engine rotation speed, that is, an actual rotation speed difference, is equal to or less than a margin rotation speed difference, an engine operating point is changed such that the actual rotation speed difference becomes greater than the margin rotation speed difference. Accordingly, the speed difference between the maximum rotation speed and the engine rotation speed is prevented from becoming equal to or less than the margin rotation speed difference. As a result, since a relatively sufficient margin is secured in the difference between the maximum rotation speed and the engine rotation speed, it is possible to prevent the engine rotation speed from falling into a high-rotation state in which the engine rotation speed exceeds the maximum rotation speed.

7 Claims, 12 Drawing Sheets

| TRAVEL MODE | | | | C1 | B1 | MG1 | MG2 |
|---|---|---|---|---|---|---|---|
| EV | FORWARD/ REVERSE | SINGLE-MOTOR DRIVE | DRIVE | | | G | M |
| | | | USE IN COMBINATION WITH ENGINE BRAKE | △ | △ | G | M |
| | | TWO-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |

| AT GEAR STAGE | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |
| Rev | ○ | | | ○ | |

CONTROL DEVICE FOR HYBRID VEHICLE

CROSS-REFERENCE TO RELATED APPLICATION

This application claims priority to Japanese Patent Application No. 2019-172304 filed on Sep. 20, 2019, incorporated herein by reference in its entirety.

BACKGROUND

1. Technical Field

The present disclosure relates to a control device for a hybrid vehicle including an engine with a supercharger and a rotary machine.

2. Description of Related Art

A control device for a hybrid vehicle including an engine and a rotary machine that can adjust a rotation speed of the engine is well known. An example thereof is a vehicle which is described in Japanese Unexamined Patent Application Publication NO. 2008-247205 (JP 2008-247205 A). JP 2008-247205 A discloses that the engine and the rotary machine are controlled such that the rotation speed of the engine is within a range which is not higher than a maximum rotation speed which is determined not to exceed predetermined upper-limit rotation speeds thereof and an output required for the engine is output from the engine.

SUMMARY

Even when the engine and the rotary machine are controlled as in the technique described in JP 2008-247205 A, the engine rotation speed of the engine may increase to be higher than the maximum rotation speed depending on vehicle conditions. In this case, decreasing an output torque of the engine can be considered. However, when the engine includes a supercharger, a response delay of the output torque of the engine may occur due to a response delay of the supercharging pressure. Accordingly, even when the engine is controlled such that the output torque of the engine is decreased, the rotation speed of the engine may be likely to fall into a high-rotation state in which the rotation speed of the engine exceeds the maximum rotation speed as the rotation speed of the engine or the rotation speed of the rotary machine becomes closer to the predetermined upper-limit rotation speed thereof.

The present disclosure provides a control device for a hybrid vehicle that can prevent a rotation speed of an engine from falling into a high-rotation state in which the rotation speed of the engine exceeds a maximum rotation speed.

According to a first aspect of the present disclosure, there is provided (a) a control device for a hybrid vehicle including an engine with a supercharger and a rotary machine that is able to adjust a rotation speed of the engine, the control device including: (b) a high rotation curbing control unit configured to control the engine and the rotary machine such that an operating point of the engine reaches a target operating point which is set such that the rotation speed of the engine is within a range which does not exceed a maximum rotation speed with a margin of the rotation speed of the engine from a predetermined upper-limit rotation speed of each of the engine and the rotary machine and an output required for the engine is output from the engine and to control the engine such that an output torque of the engine decreases when the rotation speed of the engine exceeds the maximum rotation speed; and (c) an engine operating point changing unit configured to change an operating point of the engine such that a speed difference between the maximum rotation speed and the rotation speed of the engine becomes greater than a set margin speed difference when the speed difference becomes equal to or less than the margin speed difference.

A second aspect of the present disclosure provides the control device for a hybrid vehicle according to the first aspect, further including a margin speed difference setting unit configured to set the margin speed difference to a greater value when a supercharging pressure from the supercharger is high than when the supercharging pressure is low.

A third aspect of the present disclosure provides the control device for a hybrid vehicle according to the second aspect, wherein the margin speed difference setting unit is configured to set the margin speed difference to a greater value as the supercharging pressure becomes higher.

A fourth aspect of the present disclosure provides the control device for a hybrid vehicle according to any one of the first to third aspects, further including (a) a condition determining unit configured to determine whether a vehicle condition is a predetermined vehicle condition in which the rotation speed of the engine is likely to exceed the maximum rotation speed, wherein (b) the engine operating point changing unit is configured to change the operating point of the engine such that the speed difference is greater than the margin speed difference when it is determined that the vehicle condition is the predetermined vehicle condition and the speed difference is equal to or less than the margin speed difference.

A fifth aspect of the present disclosure provides the control device for a hybrid vehicle according to the fourth aspect, wherein the condition determining unit is configured to determine whether the vehicle condition is the predetermined vehicle condition based on whether the hybrid vehicle is traveling on a road on which driving wheels to which power of the engine is transmitted are likely to slip.

A sixth aspect of the present disclosure provides the control device for a hybrid vehicle according to the fourth or fifth aspect, wherein the condition determining unit is configured to determine whether the vehicle condition is the predetermined vehicle condition based on whether the rotary machine is subjected to a predetermined output limitation.

A seventh aspect of the present disclosure provides the control device for a hybrid vehicle according to any one of the first to sixth aspects, wherein (a) the hybrid vehicle includes the engine as a drive power source and includes a transmission that is provided in a power transmission path between the engine and driving wheels, and (b) the engine operating point changing unit is configured to change the operating point of the engine by adjusting the rotation speed of the rotary machine and a gear ratio of the transmission.

The control device for a hybrid vehicle according to the first aspect includes (b) the high rotation curbing control unit that controls the engine and the rotary machine such that the operating point of the engine reaches the target operating point which is set such that the rotation speed of the engine is within a range which does not exceed a maximum rotation speed with a margin of the rotation speed of the engine from a predetermined upper-limit rotation speed of each of the engine and the rotary machine and an output required for the engine is output from the engine and controls the engine such that an output torque of the engine decreases when the rotation speed of the engine exceeds the maximum rotation speed and (c) the engine operating point changing unit that changes an operating point of the engine such that a speed difference between the maximum rotation speed and the rotation speed of the engine becomes greater than a set margin speed difference when the speed difference becomes equal to or less than the margin speed difference. Accordingly, since the operating point of the engine is changed such that the speed difference becomes greater than the margin speed difference when the speed difference is equal to or less than the margin speed difference, the difference between the maximum rotation speed and the rotation speed of the engine is prevented from becoming equal to or less than the margin speed difference. As a result, since a relatively sufficient margin is secured in the difference between the maximum rotation speed and the rotation speed of the engine, it is possible to prevent the rotation speed of the engine from falling into a high-rotation state in which the rotation speed of the engine exceeds the maximum rotation speed due to a response delay of the supercharging pressure.

The control device for a hybrid vehicle according to the second aspect further includes the margin speed difference setting unit that sets the margin speed difference to a greater value when a supercharging pressure from the supercharger is high than when the supercharging pressure is low. Accordingly, since the margin speed difference is set to a greater value when the supercharging pressure is high than when the supercharging pressure is low, the speed difference is less likely to become equal to or less than the margin speed difference when the supercharging pressure is low than when the supercharging pressure is high. As a result, since the engine operating point is less likely to be changed when the supercharging pressure is low than when the supercharging pressure is high, it is possible to curb deterioration in fuel efficiency performance due to change of the operating point of the engine and to appropriately prevent the rotation speed of the engine from falling into a high-rotation state in which the rotation speed of the engine exceeds the maximum rotation speed.

In the control device for a hybrid vehicle according to the third aspect, since the margin speed difference setting unit sets the margin speed difference to a greater value as the supercharging pressure becomes higher, it is possible to further appropriately prevent the rotation speed of the engine from falling into a high-rotation state in which the rotation speed of the engine exceeds the maximum rotation speed.

The control device for a hybrid vehicle according to the fourth aspect further includes (a) the condition determining unit that determines whether the vehicle condition is a predetermined vehicle condition in which the rotation speed of the engine is likely to exceed the maximum rotation speed, and (b) the engine operating point changing unit is configured to change the operating point of the engine such that the speed difference is greater than the margin speed difference when it is determined that the vehicle condition is the predetermined vehicle condition and the speed difference is equal to or less than the margin speed difference. Accordingly, since the engine operating point changing unit changes the operating point of the engine when it is determined that the vehicle condition is the predetermined vehicle condition and the speed difference is equal to or less than the margin speed difference, it is possible to curb excessive change of the operating point of the engine, for example, in comparison with a case in which the operating point of the engine is changed when the speed difference is equal to or less than the margin speed difference.

In the control device for a hybrid vehicle according to the fifth aspect, the condition determining unit determines whether the vehicle condition is the predetermined vehicle condition based on whether the hybrid vehicle is traveling on a road on which driving wheels to which power of the engine is transmitted are likely to slip. Accordingly, it is possible to prevent the rotation speed of the engine from falling into a high-rotation state in which the rotation speed of the engine exceeds the maximum rotation speed when the hybrid vehicle is traveling on a road on which the driving wheels are likely to slip.

In the control device for a hybrid vehicle according to the sixth aspect, the condition determining unit determines whether the vehicle condition is the predetermined vehicle condition based on whether the rotary machine is subjected to a predetermined output limitation. Accordingly, it is possible to prevent the rotation speed of the engine from falling into a high-rotation state in which the rotation speed of the engine exceeds the maximum rotation speed when the rotary machine is subjected to the predetermined output limitation.

In the control device for a hybrid vehicle according to the seventh aspect, (a) the hybrid vehicle includes the engine as a drive power source and includes a transmission that is provided in a power transmission path between the engine and driving wheels, and (b) the engine operating point changing unit changes the operating point of the engine by adjusting the rotation speed of the rotary machine and a gear ratio of the transmission. Accordingly, it is possible to appropriately change the operating point of the engine by adjusting the rotation speed of the rotary machine and the gear ratio of the transmission.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described in detail with reference to the accompanying drawings.

Figure 1:
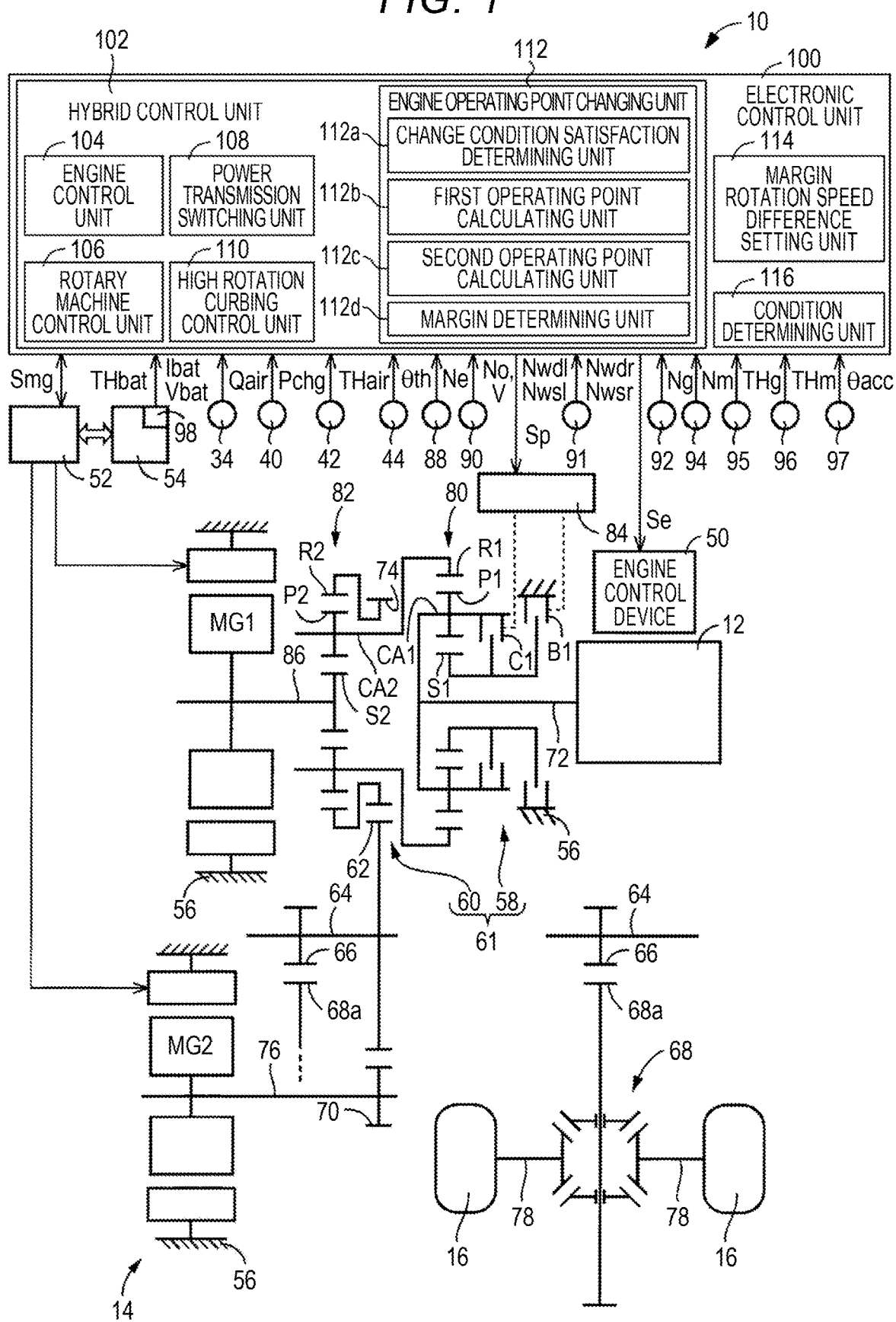
FIG. 1 is a diagram schematically illustrating a configuration of a vehicle to which the present disclosure is applied and illustrating principal parts of a control function and a control system for various types of control in the vehicle.

FIG. 1 is a diagram schematically illustrating a configuration of a vehicle 10 to which the present disclosure is applied and illustrating principal parts of a control function and a control system for various types of control in the vehicle 10. In FIG. 1, the vehicle 10 is a hybrid vehicle including an engine 12, a first rotary machine (a rotary machine) MG1, a second rotary machine MG2, a power transmission device 14, and driving wheels 16.

Figure 2:
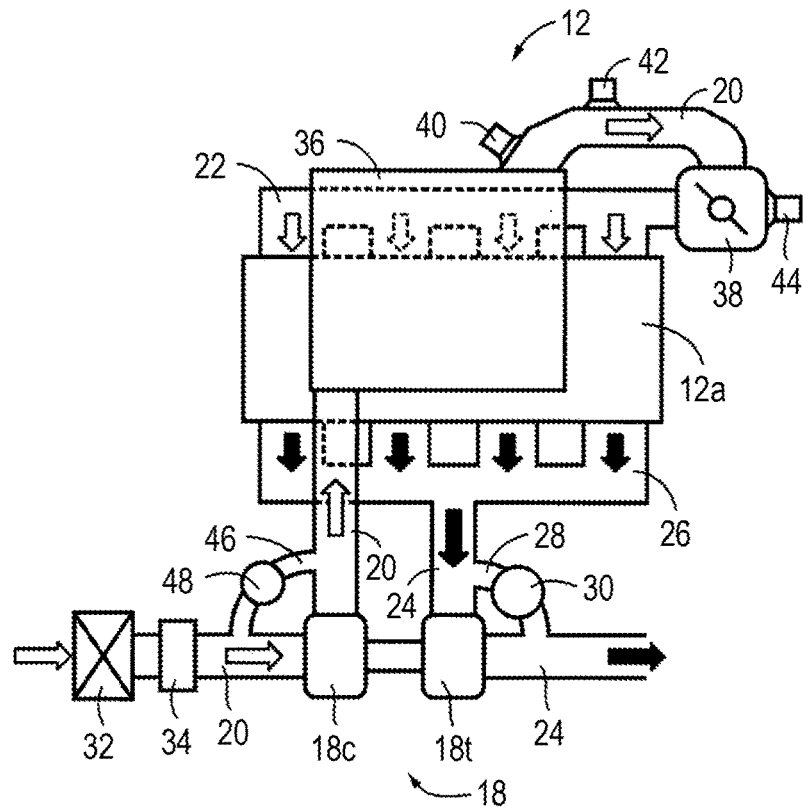
FIG. 2 is a diagram schematically illustrating a configuration of an engine.

FIG. 2 is a diagram schematically illustrating a configuration of the engine 12. In FIG. 2, the engine 12 is a power source for travel of the vehicle 10 and is a known internal combustion engine such as a gasoline engine or a diesel engine including a supercharger 18, that is, an engine with the supercharger 18. An intake pipe 20 is provided in an intake system of the engine 12, and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust-turbine supercharger, that is, a turbocharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

An exhaust bypass 28 that causes exhaust gas to flow from upstream to downstream with respect to the turbine 18t by bypassing the turbine 18t is provided in parallel in the exhaust pipe 24. A waste gate valve (=WGV) 30 that continuously controls a ratio of exhaust gas passing through the exhaust bypass 28 to exhaust gas passing through the turbine 18t is provided in the exhaust bypass 28. A valve opening of the waste gate valve 30 is continuously adjusted by causing an electronic control unit (a control unit) 100 which will be described later to operate an actuator which is not illustrated. As the valve opening of the waste gate valve 30 increases, exhaust gas of the engine 12 is more likely to be discharged via the exhaust bypass 28. Accordingly, in a supercharged state of the engine 12 in which a supercharging operation of the supercharger 18 is effective, a supercharging pressure Pchg from the supercharger 18 decreases as the valve opening of the waste gate valve 30 increases. The supercharging pressure Pchg from the supercharger 18 is a pressure of intake air and is an air pressure downstream from the compressor 18c in the intake pipe 20. A side in which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects the supercharging pressure Pchg from the supercharger 18 and an intake air temperature sensor 42 that detects an intake air temperature THair which is the temperature of intake air are provided in the intake pipe 20 between the intercooler 36 and the electronic throttle valve 38. A throttle valve opening sensor 44 that detects a throttle valve opening θth which is an opening of the electronic throttle valve 38 is provided in the vicinity of the electronic throttle valve 38, for example, in the throttle actuator.

An air recirculation bypass 46 that causes air to recirculate from downstream to upstream with respect to the compressor 18c by bypassing the compressor 18c is provided in parallel in the intake pipe 20. For example, an air bypass valve (=ABV) 48 that is opened at the time of sudden closing of the electronic throttle valve 38 to curb occurrence of a surge and to protect the compressor 18c is provided in the air recirculation bypass 46.

In the engine 12, an engine torque Te which is an output torque of the engine 12 is controlled by causing the electronic control unit 100 which will be described later to control an engine control device 50 (see FIG. 1) including the electronic throttle valve 38, a fuel injection device, an ignition device, and the waste gate valve 30.

Referring back to FIG. 1, the first rotary machine MG1 and the second rotary machine MG2 are rotary electric machines having a function of an electric motor (a motor) and a function of a power generator (a generator) and are so-called motor generators. The first rotary machine MG1 and the second rotary machine MG2 can serve as a power source for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 100 which will be described later to control the inverter 52. For example, in the case of forward rotation, an output torque of a rotary machine is a powering torque at a positive torque which is an acceleration side and is a regenerative torque at a negative torque which is a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

The power transmission device 14 includes a gear shifting unit 58, a differential unit 60, a driven gear 62, a driven shaft 64, a final gear 66, a differential device 68, and a reduction gear 70 in the case 56. The gear shifting unit 58 and the differential unit 60 are arranged coaxially with an input shaft 72 which is an input rotary member of the gear shifting unit 58. The gear shifting unit 58 is connected to the engine 12 via the input shaft 72 or the like. The differential unit 60 is connected in series to the gear shifting unit 58. The driven gear 62 engages with a drive gear 74 which is an output rotary member of the differential unit 60. The driven shaft 64 fixes the driven gear 62 and the final gear 66 such that they cannot rotate relative to each other. The final gear 66 has a smaller diameter than the driven gear 62. The differential device 68 engages with the final gear 66 via a differential ring gear 68a. The reduction gear 70 has a smaller diameter than the driven gear 62 and engages with the driven gear 62. A rotor shaft 76 of the second rotary machine MG2 which is disposed in parallel to the input shaft 72 is connected to the reduction gear 70 separately from the input shaft 72 and is connected to the second rotary machine MG2 in a power-transmittable manner. The power transmission device 14 includes an axle 78 that is connected to the differential device 68.

The power transmission device 14 having this configuration is suitably used for a vehicle of a front-engine front-drive (FF) type or a rear-engine rear-drive (RR) type. In the power transmission device 14, power which is output from the engine 12, the first rotary machine MG1, and the second rotary machine MG2 is transmitted to the driven gear 62 and is transmitted from the driven gear 62 to the driving wheels 16 sequentially via the final gear 66, the differential device 68, the axle 78, and the like. In this way, the second rotary machine MG2 is a rotary machine that is connected to the driving wheels 16 in a power-transmittable manner. In the power transmission device 14, the engine 12, the gear shifting unit 58, the differential unit 60, and the first rotary machine MG1, and the second rotary machine MG2 are arranged on different axes, whereby a shaft length is decreased. A reduction gear ratio of the second rotary machine MG2 can be set to be great. Power is synonymous with torque or force when not particularly distinguished.

The gear shifting unit 58 includes a first planetary gear mechanism 80, a clutch C1, and a brake B1. The differential unit 60 includes a second planetary gear mechanism 82. The first planetary gear mechanism 80 is a known single-pinion type planetary gear device including a first sun gear S1, a first pinion P1, a first carrier CA1 that supports the first pinion P1 such that it can rotate and revolve, and a first ring gear R1 that engages with the first sun gear S1 via the first pinion P1. The second planetary gear mechanism 82 is a known single-pinion type planetary gear device including a second sun gear S2, a second pinion P2, a second carrier CA2 that supports the second pinion P2 such that it can rotate and revolve, and a second ring gear R2 that engages with the second sun gear S2 via the second pinion P2.

In the first planetary gear mechanism 80, the first carrier CA1 is a rotary element that is integrally connected to the input shaft 72 and connected to the engine 12 via the input shaft 72 in a power-transmittable manner. The first sun gear S1 is a rotary element that is selectively connected to the case 56 via the brake B1. The first ring gear R1 is a rotary element that is connected to the second carrier CA2 of the second planetary gear mechanism 82 which is an input rotary member of the differential unit 60 and serves as an output rotary member of the gear shifting unit 58. The first carrier CA1 and the first sun gear S1 are selectively connected to each other via the clutch C1.

The clutch C1 and the brake B1 are wet frictional engagement devices and are multi-disc hydraulic frictional engagement devices of which engagement is controlled by a hydraulic actuator. In the clutch C1 and the brake B1, operating states such as an engaged state and a disengaged state are switched based on regulated hydraulic pressures Pc1 and Pb1 which are output from a hydraulic pressure control circuit 84 provided in the vehicle 10 by causing the electronic control unit 100 which will be described later to control the hydraulic pressure control circuit 84 provided in the vehicle 10.

In a state in which both the clutch C1 and the brake B1 are disengaged, a differential motion of the first planetary gear mechanism 80 is permitted. Accordingly, in this state, since a reaction torque of the engine torque Te is not taken in the first sun gear S1, the gear shifting unit 58 is in a neutral state in which mechanical power transmission is not possible, that is, a neutral state. In a state in which the clutch C1 is engaged and the brake B1 is disengaged, the rotary elements of the first planetary gear mechanism 80 rotate integrally. Accordingly, in this state, rotation of the engine 12 is transmitted from the first ring gear R1 to the second carrier CA2 at a constant speed. On the other hand, in a state in which the clutch C1 is disengaged and the brake B1 is engaged, rotation of the first sun gear S1 of the first planetary gear mechanism 80 is prohibited and rotation of the first ring gear R1 is increased to be higher than rotation of the first carrier CA1. Accordingly, in this state, rotation of the engine 12 is increased and output from the first ring gear R1. In this way, the gear shifting unit 58 serves as a two-stage stepped transmission which is switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 80 is prohibited. Accordingly, in this state, rotation of the first ring gear R1 which is the output rotary member of the gear shifting unit 58 is stopped and thus rotation of the second carrier CA2 which is the input rotary member of the differential unit 60 is stopped.

In the second planetary gear mechanism 82, the second carrier CA2 is a rotary element that is connected to the first ring gear R1 which is the output rotary member of the gear shifting unit 58 and serves as an input rotary member of the differential unit 60. The second sun gear S2 is a rotary element that is integrally connected to the rotor shaft 86 of the first rotary machine MG1 and is connected to the first rotary machine MG1 in a power-transmittable manner. The second ring gear R2 is a rotary element that is integrally connected to the drive gear 74 and is connected to the driving wheels 16 in a power-transmittable manner and serves as an output rotary member of the differential unit 60. The second planetary gear mechanism 82 is a power split mechanism that mechanically splits power of the engine 12 which is input to the second carrier CA2 via the gear shifting unit 58 to the first rotary machine MG1 and the drive gear 74. That is, the second planetary gear mechanism 82 is a differential mechanism that splits and transmits power of the engine 12 to the driving wheels 16 and the first rotary machine MG1. In the second planetary gear mechanism 82, the second carrier CA2 serves as an input element, the second sun gear S2 serves as a reaction element, and the second ring gear R2 serves as an output element. The differential unit 60 constitutes an electrical gear shifting mechanism, for example, an electrical stepless transmission, in which a differential state of the second planetary gear mechanism 82 is controlled by controlling the operating state of the first rotary machine MG1 along with the first rotary machine MG1 that is connected to the second planetary gear mechanism 82 in a power-transmittable manner. The first rotary machine MG1 is a rotary machine to which power of the engine 12 is transmitted. Since the gear shifting unit 58 is in overdrive, an increase in torque of the first rotary machine MG1 is curbed. Controlling the operating state of the first rotary machine MG1 refers to performing operation control of the first rotary machine MG1.

Figure 3:
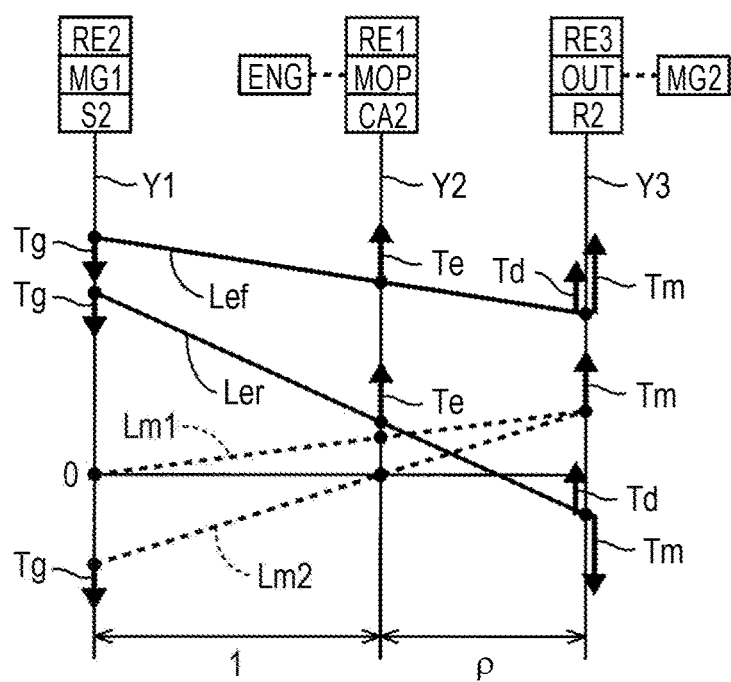
FIG. 3 is a collinear diagram relatively illustrating rotation speeds of rotary elements in a differential unit.

FIG. 3 is a collinear diagram illustrating rotation speeds of the rotary elements in the differential unit 60 relative to each other. In FIG. 3, three vertical lines Y1, Y2, and Y3 correspond to three rotary elements of the second planetary gear mechanism 82 constituting the differential unit 60. The vertical line Y1 represents the rotation speed of the second sun gear S2 which is a second rotary element RE2 connected to the first rotary machine MG1 (see "MG1" in the drawing). The vertical line Y2 represents the rotation speed of the second carrier CA2 which is a first rotary element RE1 connected to the engine 12 (see "ENG" in the drawing) via the gear shifting unit 58. The vertical line Y3 represents the rotation speed of the second ring gear R2 which is a third rotary element RE3 integrally connected to the drive gear 74 (see "OUT" in the drawing). The second rotary machine MG2 (see "MG2" in the drawing) is connected to the driven gear 62 engaging with the drive gear 74 via the reduction gear 70 or the like. A mechanical oil pump (see "MOP" in the drawing) which is provided in the vehicle 10 is connected to the second carrier CA2. This mechanical oil pump is operated with rotation of the second carrier CA2 to supply oil which is used for engaging operations of the clutch C1 and the brake B1, lubrication of the parts, and cooling of the parts. When rotation of the second carrier CA2 is stopped, the oil is supplied by an electrical oil pump (not illustrated) which is provided in the vehicle 10. The gaps between the vertical lines Y1, Y2, and Y3 are determined according to a gear ratio $\rho$ (=number of teeth of the sun gear/number of teeth of the ring gear) of the second planetary gear mechanism 82. In the relationship between the vertical axes in the collinear diagram, when the gap between a sun gear and a carrier corresponds to "1," the gap between the carrier and a ring gear corresponds to the gear ratio $\rho$.

A solid line Lef in FIG. 3 denotes an example of relative speeds of the rotary elements at the time of forward travel in a hybrid travel (=HV travel) mode in which hybrid travel using at least the engine 12 as a power source is possible. A solid line Ler in FIG. 3 denotes an example of relative speeds of the rotary elements at the time of reverse travel in the HV travel mode. In the HV travel mode, in the second planetary gear mechanism 82, for example, when an MG1 torque Tg which is a reaction torque and a negative torque of the first rotary machine MG1 with respect to an engine torque Te that is a positive torque which is input to the second carrier CA2 via the gear shifting unit 58 is input to the second sun gear S2, a direct engine-transmitted torque Td which is a positive torque appears in the second ring gear R2. For example, when the MG1 torque Tg $(=-\rho/(1+\rho)\times Te)$ which is a reaction torque with respect to the engine torque Te that is a positive torque which is input to the second carrier CA2 is input to the second sun gear S2 in a state in which the clutch C1 is engaged, the brake B1 is disengaged, and the gear shifting unit 58 is in a directly coupled state with a gear ratio of "1.0," a direct engine-transmitted torque Td $(=Te/(1+\rho)=-(1/\rho)\times Tg)$ appears in the second ring gear R2. A combined torque of the direct engine-transmitted torque Td and the MG2 torque Tm which are transmitted to the driven gear 62 can be transmitted as a drive torque of the vehicle 10 to the driving wheels 16 according to a required driving force. The first rotary machine MG1 serves as a power generator when a negative torque is generated at the time of positive rotation. A generated electric power Wg of the first rotary machine MG1 charges the battery 54 or is consumed in the second rotary machine MG2. The second rotary machine MG2 outputs the MG2 torque Tm using all or some of the generated electric power Wg or electric power from the battery 54 in addition to the generated electric power Wg. The MG2 torque Tm at the time of forward travel is a powering torque which is a positive torque at the time of forward rotation, and the MG2 torque Tm at the time of reverse travel is a powering torque which is a negative torque at the time of reverse rotation.

The differential unit 60 can operate as an electrical stepless transmission. For example, in the HV travel mode, when the rotation speed of the first rotary machine MG1, that is, the rotation speed of the second sun gear S2, increases or decreases with respect to an output rotation speed No which is the rotation speed of the drive gear 74 which is constrained on rotation of the driving wheels 16 by controlling the operating state of the first rotary machine MG1, the rotation speed of the second carrier CA2 increases or decreases. Since the second carrier CA2 is connected to the engine 12 via the gear shifting unit 58, an engine rotation speed Ne which is the rotation speed of the engine 12 increases or decreases with the increase or decrease in the rotation speed of the second carrier CA2. Accordingly, in the HV travel, it is possible to perform control such that an engine operating point (operating point) OPeng is set to an efficient operating point. This hybrid type is referred to as a mechanical split type or a split type. The first rotary machine MG1 is a rotary machine that can control the engine rotation speed Ne, that is, a rotary machine that can adjust the engine rotation speed (rotation speed) Ne. An operating point is an operation point which is expressed by a rotation speed and a torque, and the engine operating point OPeng is an operation point of the engine 12 which is expressed by the engine rotation speed Ne and the engine torque Te. The differential unit 60 and the gear shifting unit 58 can be considered as a total transmission in which the differential unit 60 and the gear shifting unit 58 are combined, that is, a composite transmission 61. In the composite transmission 61, the differential unit 60 and the gear shifting unit 58 can be controlled such that a gear ratio $\gamma tA$ (=Ne/No) indicating a ratio of the engine rotation speed Ne to the output rotation speed No changes. The composite transmission 61 is a transmission that is provided in a power transmission path between the engine 12 and the driving wheels 16.

A dotted line Lm1 in FIG. 3 represents an example of relative speeds of the rotary elements at the time of forward travel in a single-motor-driven EV mode in which motor-driven travel using only the second rotary machine MG2 as a power source is possible in a motor-driven travel (=EV travel) mode. A dotted line Lm2 in FIG. 3 represents an example of relative speeds of the rotary elements at the time of forward travel in a two-motor-driven EV mode in which motor-driven travel using both the first rotary machine MG1 and the second rotary machine MG2 as a power source is possible in the EV travel mode. The EV travel mode is a travel mode in which motor-driven travel using at least one of the first rotary machine MG1 and the second rotary machine MG2 as a power source in a state in which operation of the engine 12 is stopped is possible.

In the single-motor-driven EV mode, when both the clutch C1 and the brake B1 are disengaged and the gear shifting unit 58 falls into a neutral state, the differential unit 60 also falls into a neutral state. In this state, the MG2 torque Tm can be transmitted as a drive torque of the vehicle 10 to the driving wheels 16. In the single-motor-driven EV mode, for example, the first rotary machine MG1 is maintained at zero rotation in order to reduce a drag loss in the first rotary machine MG1. For example, even when control is performed such that the first rotary machine MG1 is maintained at zero rotation, the differential unit 60 is in the neutral state and thus the drive torque is not affected.

In the two-motor-driven EV mode, when both the clutch C1 and the brake B1 are engaged and rotation of the rotary elements of the first planetary gear mechanism 80 is prohibited, the second carrier CA2 is stopped at zero rotation. In this state, the MG1 torque Tg and the MG2 torque Tm can be transmitted as the drive torque of the vehicle 10 to the driving wheels 16.

Referring back to FIG. 1, the vehicle 10 includes an electronic control unit 100 serving as a controller including the control device for the vehicle 10 associated with control of the engine 12, the first rotary machine MG1, the second rotary machine MG2, and the like. For example, the electronic control unit 100 is configured to include a so-called microcomputer including a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity.

The electronic control unit 100 is supplied with various signals (for example, an intake air amount Qair, a supercharging pressure Pchg, an intake air temperature THair, a throttle valve opening θth, an engine rotation speed Ne, an output rotation speed No corresponding to a vehicle speed V, wheel speeds Nwdl, Nwdr, Nwsl, and Nwsr which are wheel speeds Nw of the right and left driving wheels 16 and right and left driven wheels which are not illustrated, an MG1 rotation speed Ng which is the rotation speed of the first rotary machine MG1, an MG2 rotation speed Nm which is the rotation speed of the second rotary machine MG2, an MG1 temperature THg which is a temperature of the first rotary machine MG1, for example, a stator temperature, an MG2 temperature THm which is a temperature of the second rotary machine MG2, for example, a stator temperature, an accelerator opening θacc which is an accelerator operation amount by a driver indicating the magnitude of the driver's acceleration operation, a battery temperature THbat which is a temperature of the battery 54, a battery charging/discharging current Ibat, and a battery voltage Vbat) based on detection values from various sensors (for example, an air flowmeter 34, a supercharging pressure sensor 40, an intake air temperature sensor 42, a throttle valve opening sensor 44, an engine rotation speed sensor 88, an output rotation speed sensor 90, wheel speed sensors 91, an MG1 rotation speed sensor 92, an MG2 rotation speed sensor 94, an MG1 temperature sensor 95, an MG2 temperature sensor 96, an accelerator opening sensor 97, and a battery sensor 98) which are provided in the vehicle 10. The electronic control unit 100 outputs various command signals (for example, an engine control command signal Se for controlling the engine 12, a rotary machine control command signal Smg for controlling the first rotary machine MG1 and the second rotary machine MG2, and a hydraulic pressure control command signal Sp for controlling the operating states of the clutch C1 and the brake B1) to various devices (for example, the engine control device 50, the inverter 52, the hydraulic pressure control circuit 84, and the wheel brake device 87) which are provided in the vehicle 10.

The electronic control unit 100 calculates a state of charge (SOC) value SOC [%] which is a value indicating the state of charge of the battery 54, for example, based on the battery charging/discharging current Ibat and the battery voltage Vbat. The electronic control unit 100 calculates chargeable and dischargeable powers Win and Wout for defining a feasible range of a battery power Pbat which is the power of the battery 54, for example, based on the battery temperature THbat and the SOC value SOC of the battery 54. The chargeable and dischargeable powers Win and Wout include a chargeable power Win which is a possible input power for defining limitation of an input power of the battery 54 and a dischargeable power Wout which is a possible output power for defining limitation of an output power of the battery 54. For example, the chargeable and dischargeable powers Win and Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the SOC value SOC increases in an area in which the SOC value SOC is high. For example, the dischargeable power Wout decreases as the SOC value SOC decreases in an area in which the SOC value SOC is low.

The electronic control unit 100 includes a hybrid control means, that is, a hybrid control unit 102, that realizes various types of control in the vehicle 10.

The hybrid control unit 102 has a function of an engine control means, that is, an engine control unit 104, that controls the operation of the engine 12, a function of a rotary machine control means, that is, a rotary machine control unit 106, that controls the operations of the first rotary machine MG1 and the second rotary machine MG2 via the inverter 52, and a function of a power transmission switching means, that is, a power transmission switching unit 108, that switches a power transmission state in the gear shifting unit 58, and performs hybrid drive control or the like using the engine 12, the first rotary machine MG1, and the second rotary machine MG2 based on such control functions.

The hybrid control unit 102 calculates a required drive torque Twdem which is a drive torque Tw required for the vehicle 10, for example, by applying the accelerator opening θacc and the vehicle speed V to a driving force map which is a relationship which is acquired and stored in advance by experiment or design, that is, a predetermined relationship. In other words, the required drive power Pwdem is a required drive torque Twdem at the vehicle speed V at that time. Here, the output rotation speed No or the like may be used instead of the vehicle speed V. As the driving force map, for example, a map for forward travel and a map for reverse travel are separately set.

The hybrid control unit 102 outputs an engine control command signal Se which is a command signal for controlling the engine 12 and a rotary machine control command signal Smg which is a command signal for controlling the first rotary machine MG1 and the second rotary machine MG2 such that the required drive power Pwdem is realized by at least one power source of the engine 12, the first rotary machine MG1, and the second rotary machine MG2 in consideration of a required charging/discharging power which is a charging/discharging power required for the battery 54 or the like.

For example, when the vehicle travels in the HV travel mode, the engine control command signal Se is a command value of an engine power Pe for outputting a target engine torque Tetgt at a target engine rotation speed Netgt in consideration of the optimal engine operating point OPengf and the like and realizing the required engine power Pedem in consideration of the required charging/discharging power, charging/discharging efficiency in the battery 54, and the like in addition to the required drive power Pwdem. The rotary machine control command signal Smg is a command value of a generated electric power Wg of the first rotary machine MG1 that outputs the MG1 torque Tg at the MG1 rotation speed Ng at the time of outputting a command as a reaction torque for causing the engine rotation speed Ne to reach a target engine rotation speed Netgt and is a command value of power consumption Wm of the second rotary machine MG2 that outputs the MG2 torque Tm at the MG2 rotation speed Nm at the time of outputting a command. For example, the MG1 torque Tg in the HV travel mode is calculated by feedback control in which the first rotary machine MG1 operates such that the engine rotation speed Ne reaches the target engine rotation speed Netgt. For example, the MG2 torque Tm in the HV travel mode is calculated such that the required drive torque Twdem is acquired by addition to a value corresponding to a drive torque Tw based on the engine direct-transmitted torque Td. The optimal engine operating point OPengf is determined in advance, for example, as an engine operating point OPeng at which total fuel efficiency in the vehicle 10 is the best in consideration of charging/discharging efficiency in the battery 54 in addition to the fuel efficiency of only the engine 12 when the required engine power Pedem is realized. The target engine rotation speed Netgt is a target value of the engine rotation speed Ne, that is, a target rotation speed of the engine 12, and the target engine torque Tetgt is a target value of the engine torque Te. The engine power Pe is an output, that is, power, of the engine 12 and the required engine power Pedem is an output required for the engine 12. In this way, the vehicle 10 is a vehicle in which the MG1 torque Tg which is a reaction torque of the first rotary machine MG1 is controlled such that the engine rotation speed Ne reaches the target engine rotation speed Netgt.

Figure 4:
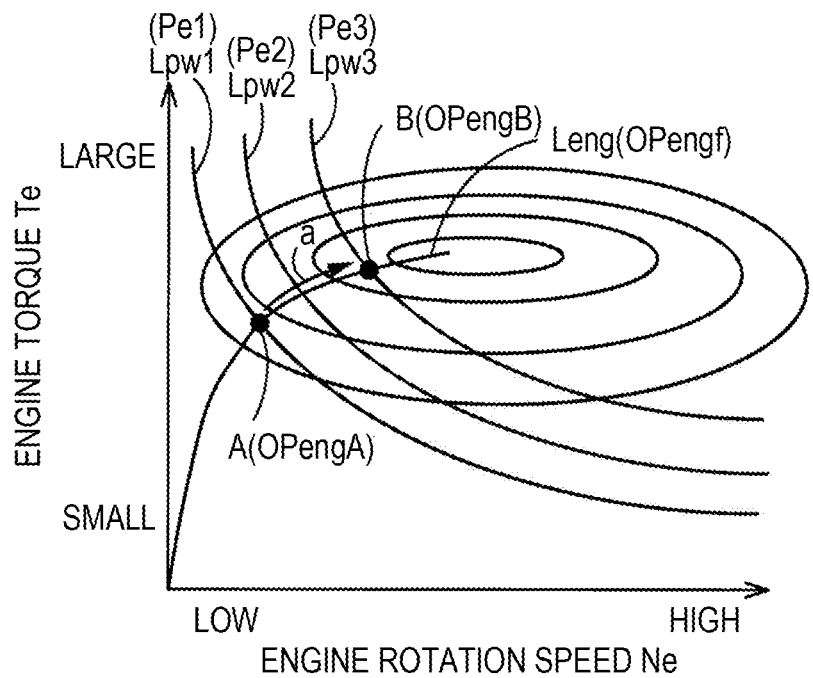
FIG. 4 is a diagram illustrating an example of an optimal engine operating point.

FIG. 4 is a diagram illustrating an example of the optimal engine operating point OPengf on a two-dimensional coordinate system with the engine rotation speed Ne and the engine torque Te as variables. In FIG. 4, a solid line Leng denotes a group of optimal engine operating points OPengf. Equi-power lines Lpw1, Lpw2, and Lpw3 denote examples in which the required engine power Pedem is required engine powers Pe1, Pe2, and Pe3, respectively. A point A is an engine operating point OPengA when the required engine power Pe1 is realized on the optimal engine operating point OPengf, and a point B is an engine operating point OPengB when the required engine power Pe3 is realized on the optimal engine operating point OPengf. The points A and B are also target values of the engine operating point OPeng which is expressed by the target engine rotation speed Netgt and the target engine torque Tetgt, that is, a target engine operating point OPengtgt which is a target operating point. For example, when the target engine operating point OPengtgt changes from the point A to the point B with an increase in the accelerator opening θacc, the engine operating point OPeng is controlled such that it changes on a path a passing through the optimal engine operating points OPengf.

The hybrid control unit 102 selectively sets up the EV travel mode or the HV travel mode as the travel mode according to the travel conditions and causes the vehicle 10 to travel in the corresponding travel mode. For example, the hybrid control unit 102 sets up the EV travel mode in a motor-driven travel area in which the required drive power Pwdem is less than a predetermined threshold value, and sets up the HV travel mode in a hybrid travel area in which the required drive power Pwdem is equal to or greater than the predetermined threshold value. Even when the required drive power Pwdem is in the motor-driven travel area, the hybrid control unit 102 sets up the HV travel mode when the SOC value SOC of the battery 54 is less than a predetermined engine start threshold value or when warming-up of the engine 12 is necessary. The engine start threshold value is a predetermined threshold value for determining whether the SOC value SOC indicates that the battery 54 needs to be charged by forcibly starting the engine 12.

Figure 5:
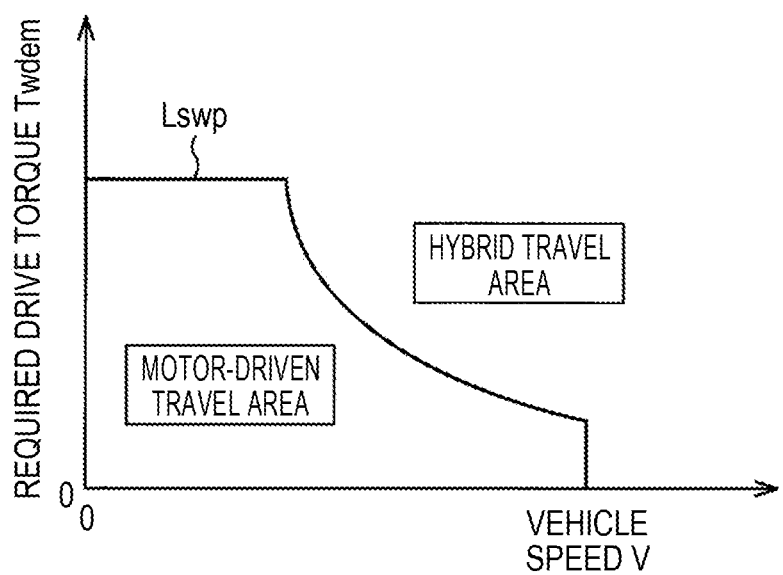
FIG. 5 is a diagram illustrating an example of a power source switching map which is used for switching control between motor-driven travel and hybrid travel.

FIG. 5 is a diagram illustrating an example of a power source switching map which is used for switching control between motor-driven travel and hybrid travel. In FIG. 5, a solid line Lswp is a boundary line between the motor-driven travel area and the hybrid travel area at which switching between the motor-driven travel and the hybrid travel is performed. An area in which the vehicle speed V is relatively low, the required drive torque Twdem is relatively small, and the required drive power Pwdem is relatively small is defined in advance in the motor-driven travel area. An area in which the vehicle speed V is relatively high, the required drive torque Twdem is relatively great, and the required drive power Pwdem is relatively great is defined in advance in the hybrid travel area. When the SOC value SOC of the battery 54 is less than the engine-start threshold value or when warming-up of the engine 12 is necessary, the motor-driven travel area in FIG. 5 may be changed to the hybrid travel area.

When the EV travel mode is set up and the required drive power Pwdem can be realized by only the second rotary machine MG2, the hybrid control unit 102 sets up a single-motor-driven EV mode. On the other hand, when the EV travel mode is set up and the required drive power Pwdem cannot be realized by only the second rotary machine MG2, the hybrid control unit 102 sets up a two-motor-driven EV mode. Although the required drive power Pwdem can be realized by only the second rotary machine MG2, the hybrid control unit 102 may set up the two-motor-driven EV mode when use of both the first rotary machine MG1 and the second rotary machine MG2 is more efficient than use of only the second rotary machine MG2.

The hybrid control unit 102 controls engagements of the clutch C1 and the brake B1 based on the set-up travel mode.

The hybrid control unit 102 outputs a hydraulic pressure control command signal Sp for engaging and/or disengaging the clutch C1 and the brake B1 to the hydraulic pressure control circuit 84 such that transmission of power for travel in the set-up travel mode becomes possible.

Figures 6, 7:
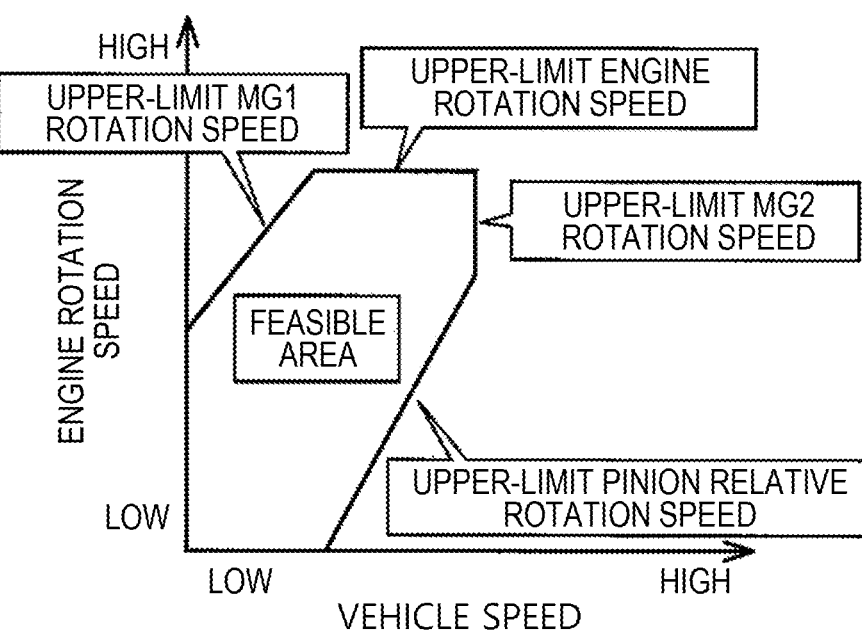
FIG. 6 is a table illustrating operating states of a clutch and a brake in each travel mode.
FIG. 7 is a diagram illustrating an example of a feasible area of an engine rotation speed.

FIG. 6 is a table illustrating operating states of the clutch C1 and the brake B1 in the travel modes. In FIG. 6, mark O denotes engagement of the clutch C1 and the brake B1, a blank denotes disengagement, and mark Δ denotes that one thereof is engaged at the time of additional use of an engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as a travel mode. The EV travel mode has two modes including the single-motor-driven EV mode and the two-motor-driven EV mode.

The single-motor-driven EV mode is realized in a state in which both the clutch C1 and the brake B1 are disengaged. In the single-motor-driven EV mode, the clutch C1 and the brake B1 are disengaged and thus the gear shifting unit 58 falls into a neutral state. When the gear shifting unit 58 falls into the neutral state, the differential unit 60 falls into a neutral state in which a reaction torque of the MG1 torque Tg is not taken in the second carrier CA2 connected to the first ring gar R1. In this state, the hybrid control unit 102 causes the second rotary machine MG2 to output the MG2 torque Tm for travel (see a dotted line Lm1 in FIG. 3). In the single-motor-driven EV mode, reverse travel may be performed by rotating the second rotary machine MG2 oppositely to the rotating direction at the time of forward travel.

In the single-motor-driven EV mode, since the first ring gear R1 is corotated with the second carrier CA2 but the gear shifting unit 58 is in the neutral state, the engine 12 is not corotated but is stopped with zero rotation. Accordingly, when regeneration control is performed in the second rotary machine MG2 during travel in the single-motor-driven EV mode, it is possible to take a large amount of regeneration. When the battery 54 is fully charged and regenerative energy is not taken during travel in the single-motor-driven EV mode, additional use of the engine brake can be considered. When the engine brake is used together, the brake B1 or the clutch C1 is engaged (see "use of engine brake together" in FIG. 6). When the brake B1 or the clutch C1 is engaged, the engine 12 is corotated and the engine brake operates.

The two-motor-driven EV mode is realized in a state in which both the clutch C1 and the brake B1 are engaged. In the two-motor-driven EV mode, since the clutch C1 and the brake B1 are engaged, rotation of the rotary elements of the first planetary gear mechanism 80 is stopped, the engine 12 is stopped with zero rotation, and rotation of the second carrier CA2 connected to the first ring gear R1 is stopped. When rotation of the second carrier CA2 is stopped, a reaction torque of the MG1 torque Tg is taken in the second carrier CA2, and thus the MG1 torque Tg can be mechanically output from the second ring gear R2 and be transmitted to the driving wheels 16. In this state, the hybrid control unit 102 causes the first rotary machine MG1 and the second rotary machine MG2 to output the MG1 torque Tg and the MG2 torque Tm for travel (see the dotted line Lm2 in FIG. 3). In the two-motor-driven EV mode, both the first rotary machine MG1 and the second rotary machine MG2 can be rotated oppositely to the rotating direction at the time of forward travel to allow reverse travel.

A low state of the HV travel mode is realized in a state in which the clutch C1 is engaged and the brake B1 is disengaged. In the low state of the HV travel mode, since the clutch C1 is engaged, the rotary elements of the first planetary gear mechanism 80 are integrally rotated and the gear shifting unit 58 falls into a directly coupled state. Accordingly, rotation of the engine 12 is transmitted from the first ring gear R1 to the second carrier CA2 at a constant speed. A high state of the HV travel mode is realized in a state in which the brake B1 is engaged and the clutch C1 is disengaged. In the high state of the HV travel mode, since the brake B1 is engaged, rotation of the first sun gear S1 is stopped and the gear shifting unit 58 falls into an overdrive state. Accordingly, rotation of the engine 12 increases and is transmitted from the first ring gear R1 to the second carrier CA2. In the HV travel mode, the hybrid control unit 102 causes the first rotary machine MG1 to output the MG1 torque Tg which is a reaction torque of the engine torque Te by power generation and causes the second rotary machine MG2 to output the MG2 torque Tm by the generated electric power Wg of the first rotary machine MG1 (see a solid line Lef in FIG. 3). In the HV travel mode, for example, in the low state of the HV travel mode, the second rotary machine MG2 can also be rotated oppositely to the rotating direction at the time of forward travel to allow reverse travel (see a solid line Ler in FIG. 3). In the HV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up.

Here, the hybrid control unit 102 controls the engine 12 and the first rotary machine MG1 such that the engine rotation speed Ne does not exceed an upper-limit engine rotation speed Nelim and the MG1 rotation speed Ng does not exceed an upper-limit MG1 rotation speed Nglim. The upper-limit engine rotation speed Nelim is, for example, a predetermined upper-limit rotation speed for making it difficult to decrease the performance of the engine 12, which is defined as a predetermined rating of the engine 12. The upper-limit MG1 rotation speed Nglim is, for example, a predetermined upper-limit rotation speed for making it difficult to decrease the performance of the first rotary machine MG1, which is defined as a predetermined rating of the first rotary machine MG1. Since the engine rotation speed Ne or the MG1 rotation speed Ng is associated with each other as can be clearly understood from the collinear diagram illustrated in FIG. 3, the MG1 rotation speed Ng can be made not to exceed the upper-limit MG1 rotation speed Nglim in addition to the engine rotation speed Ne, for example, by defining a feasible area of the engine rotation speed Ne.

FIG. 7 is a diagram illustrating an example of a feasible area of the engine rotation speed Ne on a two-dimensional coordinate system with the vehicle speed V and the engine rotation speed Ne as variables. In FIG. 7, when the engine rotation speed Ne increases in a low area of the vehicle speed, that is, the output rotation speed No, the MG1 rotation speed Ng exceeds the upper-limit MG1 rotation speed Nglim before the engine rotation speed Ne exceeds the upper-limit engine rotation speed Nelim, and thus a feasible area of the engine rotation speed Ne is defined according to the upper-limit MG1 rotation speed Nglim. As the vehicle speed V increases, the feasible area of the engine rotation speed Ne which is defined according to the upper-limit MG1 rotation speed Nglim is enlarged to a high-rotation side of the engine rotation speed Ne. However, since a predetermined upper-limit rotation speed is defined in the engine 12, the feasible area of the engine rotation speed Ne is defined according to the upper-limit engine rotation speed Nelim in a middle vehicle-speed area. On the other hand, when the output rotation speed No increases in the low area of the engine rotation speed Ne, a relative rotation speed Np2 of the second pinion P2 which is the absolute value of a rotation speed difference between an autorotation speed of the second pinion P2 and the rotation speed of the second carrier CA2 corresponding to the engine rotation speed Ne, that is, a revolution speed of the second pinion P2 increases and thus the feasible area of the engine rotation speed Ne is defined according to an upper-limit pinion relative rotation speed Np2lim of the relative rotation speed Np of the second pinion P2. The upper-limit pinion relative rotation speed Np2lim of the relative rotation speed Np of the second pinion P2 is, for example, a predetermined upper-limit rotation speed for making it difficult to decrease the performance of the second pinion P2. As the engine rotation speed Ne increases, the feasible area of the engine rotation speed Ne which is defined according to the upper-limit pinion relative rotation speed Np2lim of the relative rotation speed Np of the second pinion P2 is enlarged to a high vehicle-speed side. However, since a predetermined upper-limit rotation speed is defined in the second rotary machine MG2, the feasible area of the engine rotation speed Ne is defined according to an upper-limit MG2 rotation speed Nmlim in a high vehicle-speed area. The upper-limit MG2 rotation speed Nmlim is, for example, a predetermined upper-limit rotation speed for making it difficult to decrease the performance of the second rotary machine MG2, which is defined as a predetermined rating of the second rotary machine MG2.

When the engine rotation speed Ne does not exceed the upper-limit rotation speed in the feasible area of the engine rotation speed Ne as illustrated in FIG. 7, the engine rotation speed Ne cannot exceed the upper-limit engine rotation speed Nelim and the MG1 rotation speed Ng cannot exceed the upper-limit MG1 rotation speed Nglim. In this embodiment, in order for the engine rotation speed Ne not to exceed the upper-limit engine rotation speed Nelim and in order for the MG1 rotation speed Ng not to exceed the upper-limit MG1 rotation speed Nglim, the hybrid control unit 102 more appropriately performs control such that the engine rotation speed Ne is within a range which is not greater than a maximum rotation speed Nemax of the engine rotation speed Ne set lower by a margin $\alpha$ than the upper-limit rotation speed in the feasible area of the engine rotation speed Ne. The margin $\alpha$ is, for example, a margin of the engine rotation speed Ne which is determined in advance such that the engine rotation speed Ne and the MG1 rotation speed Ng do not exceed the predetermined upper-limit rotation speeds thereof. Since the engine 12 is controlled within a range which is not greater than the maximum rotation speed Nemax, the first rotary machine MG1 is controlled within a range which is not greater than a maximum rotation speed Ngmax of the MG1 rotation speed Ng which is set to be lower by a margin $\beta$ than the upper-limit MG1 rotation speed Nglim. The margin $\beta$ is, for example, a margin of the MG1 rotation speed Ng which is determined in advance such that the MG1 rotation speed Ng does not exceed the upper-limit MG1 rotation speed Nglim.

The above-mentioned target engine operating point OPengtgt is set as an engine operating point OPeng for realizing the required engine power Pedem, and is set in consideration that the engine rotation speed Ne is within a range which is not greater than the maximum rotation speed Nemax. The hybrid control unit 102 serves as a high rotation curbing control means, that is, a high rotation curbing control unit 110, that controls the engine 12 and the first rotary machine MG1 such that the engine operating point OPeng reaches the target engine operating point OPengtgt which is set such that the engine rotation speed Ne is within a range not greater than the maximum rotation speed Nemax with a margin (=margin $\alpha$) of the engine rotation speed Ne from the predetermined upper-limit rotation speeds of the engine 12 and the first rotary machine MG1 and which is set such that the required engine power Pedem is output from the engine 12. Control of the engine 12 is, for example, control of the engine torque Te for outputting the target engine torque Tetgt. Control of the first rotary machine MG1 is, for example, control of the MG1 torque Tg by feedback control for operating the first rotary machine MG1 such that the engine rotation speed Ne reaches the target engine rotation speed Netgt.

The engine rotation speed Ne may increase to exceed the maximum rotation speed Nemax depending on a vehicle condition. In this case, decreasing the engine torque Te can be considered. However, since the engine 12 includes the supercharger 18, the engine rotation speed Ne may be more likely to fall into a high-rotation state as the engine rotation speed Ne or the MG1 rotation speed Ng approaches a predetermined upper-limit rotation speed thereof due to a response delay of the supercharging pressure Pchg even when the engine 12 is controlled such that the engine torque Te is decreased. Therefore, in order to prevent the engine rotation speed Ne from falling into a high-rotation state in which the engine rotation speed Ne exceeds the maximum rotation speed Nemax, the hybrid control unit 102 changes the engine operating point OPeng such that an actual rotation speed difference $\Delta N$ [rpm] which is a speed difference between the maximum rotation speed Nemax and the engine rotation speed Ne becomes greater than a margin rotation speed difference (a margin speed difference) $\Delta Nr$ [rpm] when the actual rotation speed difference $\Delta N$ is equal to or less than the margin rotation speed difference $\Delta Nr$.

Specifically, in order to realize a control function of preventing the engine rotation speed Ne from falling into a high-rotation state in which the engine rotation speed Ne exceeds the maximum rotation speed Nemax, the electronic control unit 100 includes an engine operating point changing means, that is, an engine operating point changing unit 112, in the hybrid control unit 102 and the electronic control unit 100 includes a margin rotation speed difference setting means, that is, a margin rotation speed difference setting unit (a margin speed difference setting unit) 114. The electronic control unit 100 further includes a condition determining means, that is, a condition determining unit 116. The condition determining unit 116 determines whether the engine rotation speed Ne exceeds the maximum rotation speed Nemax.

When the condition determining unit 116 determines that the engine rotation speed Ne exceeds the maximum rotation speed Nemax, the high rotation curbing control unit 110 controls the engine 12 such that the engine torque Te decreases. The high rotation curbing control unit 110 decreases the engine torque Te, for example, by performing at least one torque-down control of decreasing an opening of the electronic throttle valve 38 and delaying an ignition time. Alternatively, the high rotation curbing control unit 110 decreases the engine torque Te, for example, by performing fuel-cut control for stopping supply of fuel to the engine 12.

The condition determining unit 116 determines whether the vehicle condition is a predetermined vehicle condition in which the engine rotation speed Ne is likely to exceed the maximum rotation speed Nemax.

When the vehicle travels on a road on which the driving wheels 16 is likely to slip, that is, a slippery road, the output rotation speed No is likely to increase due to idling of the driving wheels 16 and the engine rotation speed Ne is also likely to increase. Alternatively, when the vehicle is traveling on a road on which the driving wheels 16 are likely to slip, the output rotation speed No is likely to decrease due to lock of the driving wheels 16 and the MG1 rotation speed Ng is also likely to increase. The slippery road is a road on which the driving wheels 16 are likely to idle or to be locked and examples thereof include a low-μ road, a rough road, and an unpaved road.

The condition determining unit 116 determines whether the vehicle condition is the predetermined vehicle condition based on whether the vehicle 10 is traveling on a road on which the driving wheels 16 are likely to slip. The condition determining unit 116 determines whether the vehicle 10 is traveling on a road which the driving wheels 16 are likely to slip, for example, based on whether a difference between an average wheel speed Nwd of the wheel speeds Nwdl and Nwdr of the driving wheels 16 and an average wheel speed Nws of the wheel speeds Nwsl and Nwsr of the driven wheels is greater than a predetermined slip determination threshold value for determining whether a tire slip has occurred. Alternatively, it may be determined whether the vehicle 10 is traveling on a road which the driving wheels 16 are likely to slip using a wheel slip rate SR (=(Nwd−Nws)/Nwd), rates of change of the wheel speeds Nwdl, Nwdr, Nwsl, and Nwsr, an outside air temperature, a road surface temperature, vehicle acceleration, and the like.

The engine operating point changing unit 112 includes a change condition satisfaction determining means, that is, a change condition satisfaction determining unit 112a, a first operating point calculating means, that is, a first operating point calculating unit 112b, a second operating point calculating means, that is, a second operating point calculating unit 112c, and a margin determining means, that is, a margin determining unit 112d. When the change condition satisfaction determining unit 112a determines that an operating point change condition CD for changing the engine operating point OPeng has been satisfied, the engine operating point changing unit 112 changes the engine operating point OPeng, for example, such that the engine operating point OPeng which is controlled to the optimal engine operating point OPengf by the hybrid control unit 102 reaches a first target engine operating point OPengtgt1 which is calculated by the first operating point calculating unit 112b or a second target engine operating point OPengtgt2 which is calculated by the second operating point calculating unit 112c.

The change condition satisfaction determining unit 112a determines that the operating point change condition CD is satisfied when a preset first condition CD1 and a preset second condition CD2 are satisfied. The first condition CD1 is satisfied, for example, when the condition determining unit 116 determines that the vehicle condition is the predetermined vehicle condition. The second condition CD2 is satisfied, for example, when the actual rotation speed difference $\Delta N$ is equal to or less than a margin rotation speed difference $\Delta Nr$ which is set by a margin rotation speed difference setting unit 114 ($\Delta N \le \Delta Nr$).

The actual rotation speed difference $\Delta N$ is a speed difference (Nemax1−Ne1) between a maximum rotation speed Nemax1 [rpm] and an engine rotation speed Ne1 [rpm]. The maximum rotation speed Nemax1 is, for example, a maximum rotation speed Nemax of the engine rotation speed Ne which is set to be lower by a margin α than an upper-limit rotation speed at a vehicle speed V1 [km/h] which is detected by the output rotation speed sensor 90 when the condition determining unit 116 determines that the vehicle condition is the predetermined vehicle condition in the feasible area of the engine rotation speed Ne illustrated in FIG. 7. The engine rotation speed Ne1 is, for example, an engine rotation speed Ne which is detected by the engine rotation speed sensor 88 when the condition determining unit 116 determines that the vehicle condition is the predetermined vehicle condition.

Figure 8:
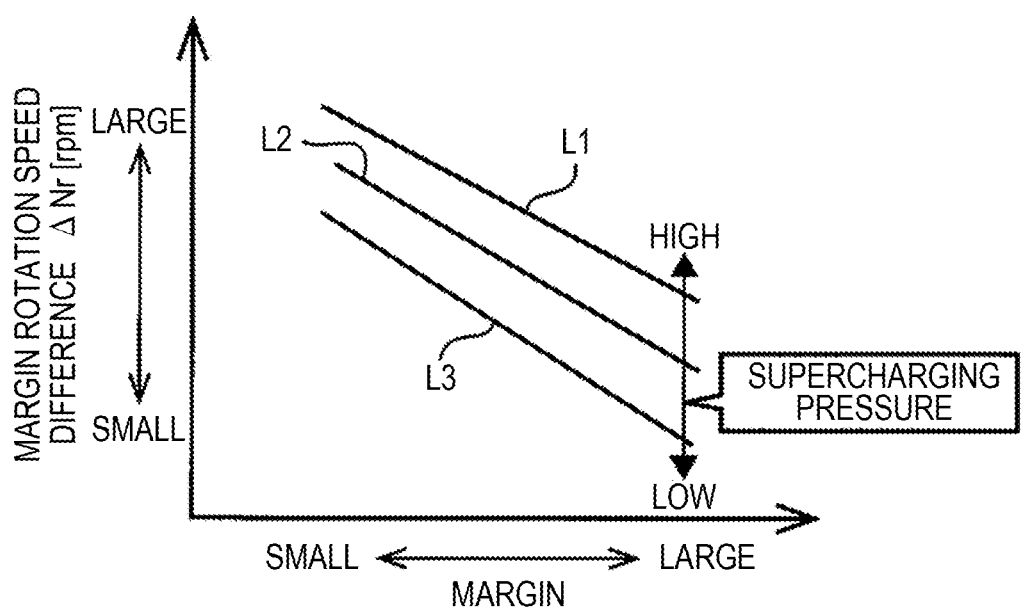
FIG. 8 is a diagram illustrating a margin rotation speed difference setting map which is used to set a margin rotation speed difference.

When the condition determining unit 116 determines that the vehicle condition is the predetermined vehicle condition, the margin rotation speed difference setting unit 114 sets the margin rotation speed difference $\Delta Nr$ using a margin rotation speed difference setting map illustrated in FIG. 8. In the margin rotation speed difference setting map, the margin rotation speed difference $\Delta Nr$ is set to increase as a margin between the engine rotation speed Ne during travel of a vehicle and the maximum rotation speed Nemax decreases, and the margin rotation speed difference $\Delta Nr$ is set to decrease as the margin increases. The margin can be expressed, for example, by a friction coefficient μ of a road on which the vehicle is traveling. As the friction coefficient μ decreases, the engine rotation speed Ne is more likely to increase and thus the margin decreases. As the friction coefficient μ increases, the engine rotation speed Ne is less likely to increase and thus the margin increases. The friction coefficient μ of a road may be expressed by a wheel slip rate SR. When the friction coefficient μ of a road is expressed by the wheel slip rate SR, the friction coefficient μ of the road decreases as the wheel slip rate SR increases and the friction coefficient μ of the road increases as the wheel slip rate SR decreases. For example, the friction coefficient μ of a road or the wheel slip rate SR can be calculated by the condition determining unit 116 using wheel speeds Nwdl, Nwdr, Nwsl, and Nwsr which are detected from the wheel speed sensors 91.

In the margin rotation speed difference setting map, for example, one straight line is selected from a plurality of straight lines including a first straight line L1, a second straight line L2, and a third straight line L3 as a part thereof based on a supercharging pressure Pchg which is detected from the supercharging pressure sensor 40 when the condition determining unit 116 determines that the vehicle condition is the predetermined vehicle condition, and the margin rotation speed difference $\Delta Nr$ is set. The first straight line L1, the second straight line L2, and the third straight line L3 represent some straight lines of the plurality of straight lines, and other straight lines are omitted in the margin rotation speed difference setting map. In the margin rotation speed difference setting map, the plurality of straight lines are arranged such that the margin rotation speed difference $\Delta Nr$ is set to be greater as the detected supercharging pressure Pchg increases. The first straight line L1 is a straight line indicating a case in which the detected supercharging pressure Pchg is relatively high and responsiveness of the engine torque Te is relatively slow. The third straight line L3 is a straight line indicating a case in which the detected supercharging pressure Pchg is relatively low, for example, the supercharging pressure Pchg is 0, and the responsiveness of the engine torque Te is relatively fast. The second straight line L2 is a straight line indicating a case in which the detected supercharging pressure Pchg is interposed between the supercharging pressure Pchg at which the first straight line L1 is selected and the supercharging pressure Pchg at which the third straight line L3 is selected. That is, as described in the margin rotation speed difference setting map, the margin rotation speed difference setting unit 114 sets the margin rotation speed difference ΔNr to a greater value when the supercharging pressure Pchg is high than when the supercharging pressure Pchg is low based on the detected supercharging pressure Pchg, and sets the margin rotation speed difference ΔNr to be a greater value as the detected supercharging pressure Pchg increases.

When the change condition satisfaction determining unit 112a determines that the operating point change condition CD has been satisfied, the first operating point calculating unit 112b calculates a first target engine operating point OPengtgt1 such that the actual rotation speed difference ΔN is greater than the margin rotation speed difference ΔNr. The first target engine operating point OPengtgt1 is expressed by a first target engine rotation speed Netgt1 and a first target engine torque Tetgt1. The first engine rotation speed Netgt1 is an engine rotation speed Ne which is obtained by subtracting the margin rotation speed difference ΔNr and a preset margin rotation speed Nem from the maximum rotation speed Nemax (Netgt1=Nemax1−(ΔNr+Nem)). The first target engine torque Tetgt1 is, for example, an engine torque Te when the engine rotation speed Ne is shifted to the first target engine rotation speed Netgt1 in a state in which the engine operating point OPeng when the change condition satisfaction determining unit 112a determines that the operating point change condition CD in FIG. 4 has been satisfied is equal to the engine power Pe. That is, the first operating point calculating unit 112b calculates the first target engine operating point OPengtgt1 such that the actual rotation speed difference ΔN becomes greater by the margin rotation speed Nem than the margin rotation speed difference ΔNr.

When the first operating point calculating unit 112b calculates the first target engine operating point OPengtgt1 and the engine operating point OPeng is shifted to reach the calculated first target engine operating point OPengtgt1, the margin determining unit 112d determines whether there is a sufficient margin between a rotation speed of another rotary element and a predetermined upper-limit rotation speed, for example, between the relative rotation speed Np2 of the second pinion P2 and the upper-limit pinion relative rotation speed Np2lim. For example, when a difference between a maximum rotation speed Np2max and the relative rotation speed Np2 of the second pinion P2 is greater than a preset margin rotation speed difference ΔNp2, the margin determining unit 112d determines that there is a sufficient margin between the relative rotation speed Np2 of the second pinion P2 and the upper-limit pinion relative rotation speed Np2lim. The maximum rotation speed Np2max is a relative rotation speed Np2 of the second pinion P2 which is set to be lower by a margin γ than the upper-limit pinion relative rotation speed Np2lim. The margin γ is, for example, a margin of the relative rotation speed Np2 of the second pinion P2 which is determined in advance such that the relative rotation speed Np2 of the second pinion P2 does not exceed the upper-limit pinion relative rotation speed Np2lim. The relative rotation speed Np2 of the second pinion P2 when the engine operating point OPeng is shifted to reach the first target engine operating point OPengtgt1 is estimated, for example, from the first target engine rotation speed Netgt1 and the MG2 rotation speed Nm.

When the margin determining unit 112d determines that there is not a sufficient margin between the rotation speed of the other rotary element and the predetermined upper-limit rotation speed, the second operating point calculating unit 112c calculates the second target engine operating point OPengtgt2 such that the margin between the engine rotation speed Ne1 and the maximum rotation speed Nemax1 is equal to the margin between the relative rotation speed Np2 of the second pinion P2 and the maximum rotation speed Np2max. The second target engine operating point OPengtgt2 is expressed by a second target engine rotation speed Netgt2 and a second target engine torque Tetgt2. The second target engine rotation speed Netgt2 is an engine rotation speed Ne at which a difference between the second target engine rotation speed Netgt2 and the maximum rotation speed Nemax1 is equal to a difference between the relative rotation speed Np2 of the second pinion P2 and the maximum rotation speed Np2max when the engine operating point OPeng is shifted to reach the second target engine operating point OPengtgt2. The second target engine torque Tetgt2 is, for example, an engine torque Te when the engine rotation speed Ne is shifted to the second target engine rotation speed Netgt2 in a state in which the engine operating point OPeng when the change condition satisfaction determining unit 112a determines that the operating point change condition CD in FIG. 4 has been satisfied is equal to the engine power Pe. The relative rotation speed Np2 of the second pinion P2 when the engine operating point OPeng is shifted to reach the second target engine operating point OPengtgt2 is estimated, for example, from the second target engine rotation speed Netgt2 and the MG2 rotation speed Nm.

When the margin determining unit 112d determines that there is a sufficient margin between the rotation speed of the other rotary element and the predetermined upper-limit rotation speed, the engine operating point changing unit 112 selects the first target engine operating point OPengtgt1 calculated by the first operating point calculating unit 112b as a target engine operating point OPengtgt and changes the engine operating point OPeng by adjusting the MG1 rotation speed Ng of the first rotary machine MG1, that is, the MG1 torque Tg, and the gear ratio γtA of the composite transmission 61 such that the engine operating point OPeng reaches the first target engine operating point OPengtgt1. For example, the engine operating point changing unit 112 changes the engine operating point OPeng by adjusting the MG1 rotation speed Ng of the first rotary machine MG1, that is, the MG1 torque Tg, and the gear ratio γtA of the composite transmission 61 such that the engine rotation speed Ne reaches the first target engine rotation speed Netgt1 and the gear ratio γtA reaches a first target gear ratio γttgt1. The first target gear ratio γttgt1 is a value obtained by dividing the first target engine rotation speed Netgt1 by an output rotation speed No1 (Netgt1/No1). The output rotation speed No1 is an output rotation speed No which is detected from the output rotation speed sensor 90 when the change condition satisfaction determining unit 112a determines that the operating point change condition CD has been satisfied.

When the margin determining unit 112d determines that there is not a sufficient margin between the rotation speed of the other rotary element and the predetermined upper-limit rotation speed, the engine operating point changing unit 112 selects the second target engine operating point OPengtgt2 calculated by the second operating point calculating unit 112c as a target engine operating point OPengtgt and changes the engine operating point OPeng by adjusting the MG1 rotation speed Ng of the first rotary machine MG1, that is, the MG1 torque Tg, and the gear ratio γtA of the composite transmission 61 such that the engine operating point OPeng reaches the second target engine operating point OPengtgt2. For example, the engine operating point changing unit 112 changes the engine operating point OPeng by adjusting the MG1 rotation speed Ng of the first rotary machine MG1, that is, the MG1 torque Tg, and the gear ratio γtA of the composite transmission 61 such that the engine rotation speed Ne reaches the second target engine rotation speed Netgt2 and the gear ratio γtA reaches a second target gear ratio γttgt2. The second target gear ratio γttgt2 is a value obtained by dividing the second target engine rotation speed Netgt2 by the output rotation speed No1 (Netgt2/No1).

Figure 9:
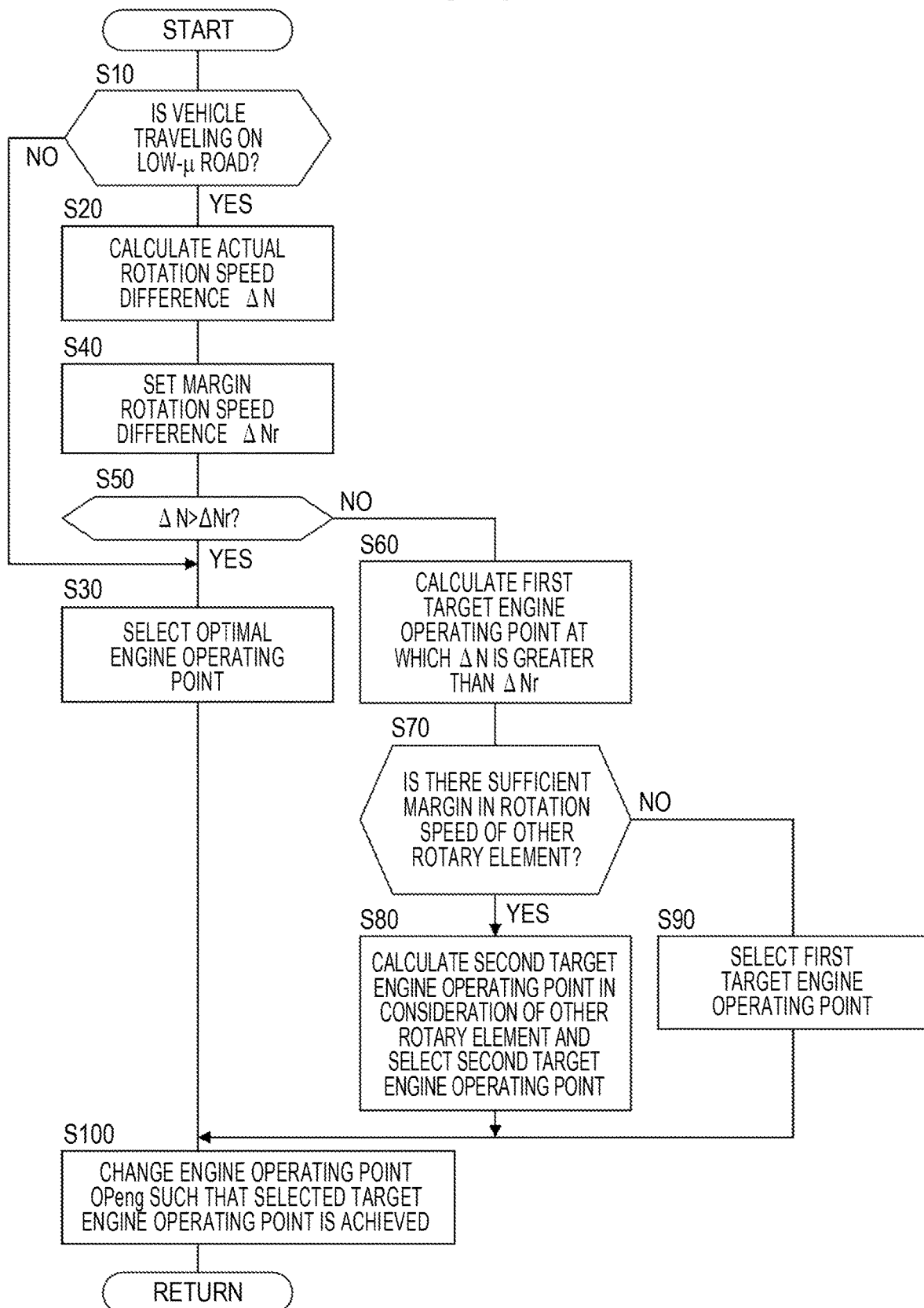
FIG. 9 is a flowchart illustrating a principal part of a control operation of an electronic control unit and illustrating a control operation for preventing an engine rotation speed from falling into a high-rotation state in which the engine rotation speed exceeds a maximum rotation speed.
Figure 10:
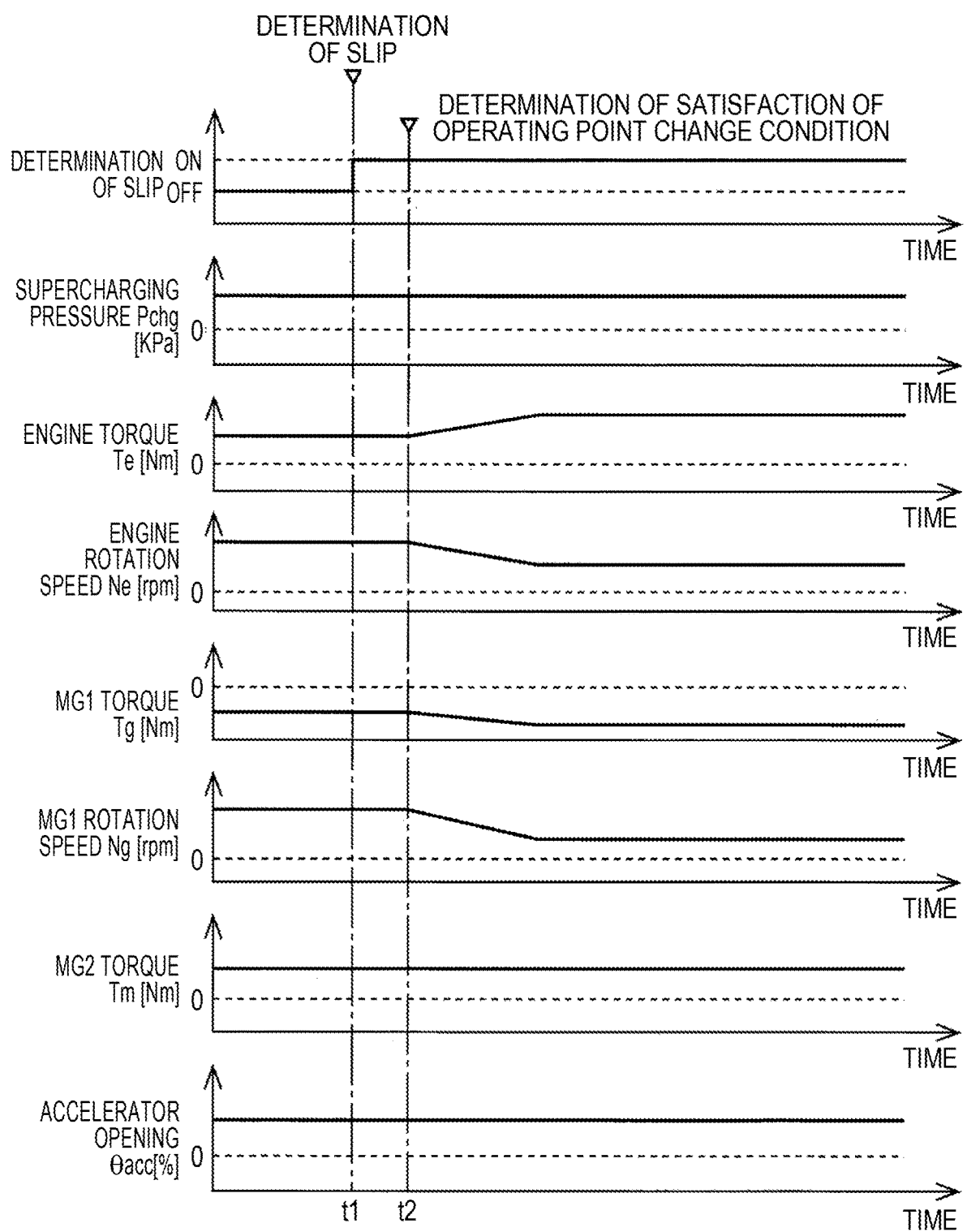
FIG. 10 is a timing chart illustrating an example in which the control operation illustrated in the flowchart of FIG. 9 is performed.

FIG. 9 is a flowchart illustrating a principal part of a control operation of the electronic control unit 100 and illustrating a control operation for preventing the engine rotation speed Ne from falling into a high-rotation state in which the engine rotation speed Ne exceeds the maximum rotation speed Nemax. FIG. 10 is a timing chart illustrating an example in which the control operation illustrated in the flowchart of FIG. 9 is performed.

In FIG. 9, first, in Step (the word "step" is omitted below) S10 corresponding to the functions of the change condition satisfaction determining unit 112a and the condition determining unit 116, it is determined whether the vehicle 10 is traveling on a road on which the driving wheels 16 are likely to slip, for example, whether the vehicle 10 is traveling on a low-μ road. When the determination result of S10 is positive (time point t1 in FIG. 10), that is, when the vehicle 10 is traveling on a road on which the driving wheels 16 are likely to slip, S20 corresponding to the function of the change condition satisfaction determining unit 112a is performed. When the determination result of S10 is negative, that is, when the operating point change condition CD is not satisfied and the vehicle 10 is not traveling on a road on which the driving wheels 16 are likely to slip, S30 corresponding to the function of the hybrid control unit 102 is performed. In S20, the actual rotation speed difference ΔN which is a speed difference between the maximum rotation speed Nemax1 and the engine rotation speed Ne1 is calculated. Then, S40 corresponding to the function of the margin rotation speed difference setting unit 114 is performed. In S40, the margin rotation speed difference ΔNr is set, for example, using the margin rotation speed difference setting map illustrated in FIG. 8. Then, S50 corresponding to the function of the change condition satisfaction determining unit 112a is performed. In S50, it is determined whether the actual rotation speed difference ΔN is greater than the margin rotation speed difference ΔNr (ΔN>ΔNr). When the determination result of S50 is positive, that is, when the actual rotation speed difference ΔN is not equal to or less than the margin rotation speed difference ΔNr and the operating point change condition CD is not satisfied, S30 is performed. When the determination result of S50 is negative (time point t2 in FIG. 10), that is, when the actual rotation speed difference ΔN is equal to or less than the margin rotation speed difference ΔNr and the operating point change condition CD is satisfied, S60 corresponding to the function of the first operating point calculating unit 112b is performed. In S30, an optimal engine operating point OPengf is selected as the target engine operating point OPengtgt.

In S60, the first target engine operating point OPengtgt1 is calculated such that the actual rotation speed difference ΔN is greater than the margin rotation speed difference AΔr. Then, S70 corresponding to the function of the margin determining unit 112d is performed. In S70, it is determined whether there is a sufficient margin between the rotation speed of the other rotary element and the predetermined upper-limit rotation speed, that is, whether there is a sufficient margin at the rotation speed of the other rotary element, when the engine operating point OPeng is shifted to reach the first target engine operating point OPengtgt1 calculated in S60. When the determination result of S70 is positive, that is, when there is not a sufficient margin between the rotation speed of the other rotary element and the predetermined upper-limit rotation speed, S80 corresponding to the functions of the second operating point calculating unit 112c and the engine operating point changing unit 112 is performed. When the determination result of S70 is negative, that is, when there is a sufficient margin between the rotation speed of the other rotary element and the predetermined upper-limit rotation speed, S90 corresponding to the function of the engine operating point changing unit 112 is performed. In S80, the second target engine operating point OPengtgt2 is calculated such that the margin between the engine rotation speed Ne and the maximum rotation speed Nemax1 is equal to the margin between the relative rotation speed Np2 of the second pinion P2 and the maximum rotation speed Np2max, and the calculated second target engine operating point OPengtgt2 is selected as a target engine operating point OPengtgt. In S90, the first target engine operating point OPengtgt1 calculated in S60 is selected as the target engine operating point OPengtgt. Then, in S100 corresponding to the functions of the engine operating point changing unit 112 and the hybrid control unit 102, the engine operating point OPeng is changed to reach the target engine operating point OPengtgt which is selected in any one of S30, S80, and S90.

According to this embodiment described above, the control device for a hybrid vehicle according to the first aspect includes: the high rotation curbing control unit 110 that controls the engine 12 and the first rotary machine MG1 such that the engine operating point OPeng reaches the target engine operating point OPengtgt which is set such that the engine rotation speed Ne is within a range which does not exceed the maximum rotation speed Nemax with a margin of the engine rotation speed Ne from the predetermined upper-limit rotation speed of each of the engine 12 and the first rotary machine MG1 and an output required for the engine 12 is output from the engine 12 and controls the engine 12 such that the engine torque Te decreases when the engine rotation speed Ne exceeds the maximum rotation speed Nemax; and the engine operating point changing unit 112 that changes the engine operating point OPeng such that a speed difference between the maximum rotation speed Nemax and the engine rotation speed Ne, that is, the actual rotation speed difference ΔN, becomes greater than the margin rotation speed difference ΔNr when the actual rotation speed difference ΔN becomes equal to or less than the margin rotation speed difference ΔNr. Accordingly, since the engine operating point OPeng is changed such that the actual rotation speed difference ΔN becomes greater than the margin rotation speed difference ΔNr when the actual rotation speed difference ΔN is equal to or less than the margin rotation speed difference ΔNr, the difference between the maximum rotation speed Nemax and the engine rotation speed Ne is prevented from becoming equal to or less than the margin rotation speed difference ΔNr. As a result, since a relatively sufficient margin is secured in the difference between the maximum rotation speed Nemax and the engine rotation speed Ne, it is possible to prevent the engine rotation speed Ne from falling into a high-rotation state in which the engine rotation speed Ne exceeds the maximum rotation speed Nemax due to a response delay of the supercharging pressure Pchg.

According to this embodiment, the control device for a hybrid vehicle further includes the margin rotation speed difference setting unit 114 that sets the margin rotation speed difference ΔNr to a greater value when the supercharging pressure Pchg from the supercharger 18 is high than when the supercharging pressure is low. Accordingly, since the margin rotation speed difference ΔNr is set to a greater value when the supercharging pressure Pchg is high than when the supercharging pressure Pchg is low, the actual rotation speed difference ΔN is less likely to become equal to or less than the margin rotation speed difference ΔNr when the supercharging pressure Pchg is low than when the supercharging pressure Pchg is high. As a result, since the engine operating point OPeng is less likely to be changed when the supercharging pressure Pchg is low than when the supercharging pressure Pchg is high, it is possible to curb deterioration in fuel efficiency performance due to change of the engine operating point OPeng and to appropriately prevent the engine rotation speed Ne from falling into a high-rotation state in which the engine rotation speed Ne exceeds the maximum rotation speed Nemax.

According to this embodiment, since the margin rotation speed difference setting unit 114 sets the margin rotation speed difference ΔNr to a greater value as the supercharging pressure Pchg becomes higher, it is possible to further appropriately prevent the engine rotation speed Ne from falling into a high-rotation state in which the engine rotation speed Ne exceeds the maximum rotation speed Nemax.

The control device for a hybrid vehicle according to this embodiment further includes the condition determining unit 116 that determines whether the vehicle condition is a predetermined vehicle condition in which the engine rotation speed Ne is likely to exceed the maximum rotation speed Nemax. The engine operating point changing unit 112 changes the engine operating point OPeng such that the actual rotation speed difference ΔN is greater than the margin rotation speed difference ΔNr when it is determined that the vehicle condition is the predetermined vehicle condition and the actual rotation speed difference ΔN is equal to or less than the margin rotation speed difference ΔNr. Accordingly, since the engine operating point changing unit 112 changes the engine operating point OPeng when it is determined that the vehicle condition is the predetermined vehicle condition and the actual rotation speed difference ΔN is equal to or less than the margin rotation speed difference ΔNr, it is possible to curb excessive change of the engine operating point OPeng, for example, in comparison with a case in which the engine operating point OPeng is changed when the actual rotation speed difference ΔN is equal to or less than the margin rotation speed difference ΔNr.

According to this embodiment, the condition determining unit 116 determines whether the vehicle condition is the predetermined vehicle condition based on whether the vehicle 10 is traveling on a road on which the driving wheels 16 to which power of the engine 12 is transmitted are likely to slip. Accordingly, it is possible to prevent the engine rotation speed Ne from falling into a high-rotation state in which the engine rotation speed Ne exceeds the maximum rotation speed Nemax when the vehicle 10 is traveling on a road on which the driving wheels 16 are likely to slip.

According to this embodiment, the vehicle 10 includes the composite transmission 61 that is provided in the power transmission path between the engine 12 and the driving wheels 16, and the engine operating point changing unit 112 changes the engine operating point OPeng by adjusting the MG1 rotation speed Ng of the first rotary machine MG1 and the gear ratio γtA of the composite transmission 61. Accordingly, it is possible to appropriately change the engine operating point OPeng by adjusting the MG1 rotation speed Ng of the first rotary machine MG1 and the gear ratio γtA of the composite transmission 61.

Another embodiment of the present disclosure will be described below. In the following description, elements common to those in the above-mentioned embodiment will be referred to by the same reference signs and description thereof will not be repeated.

Figures 11, 12:
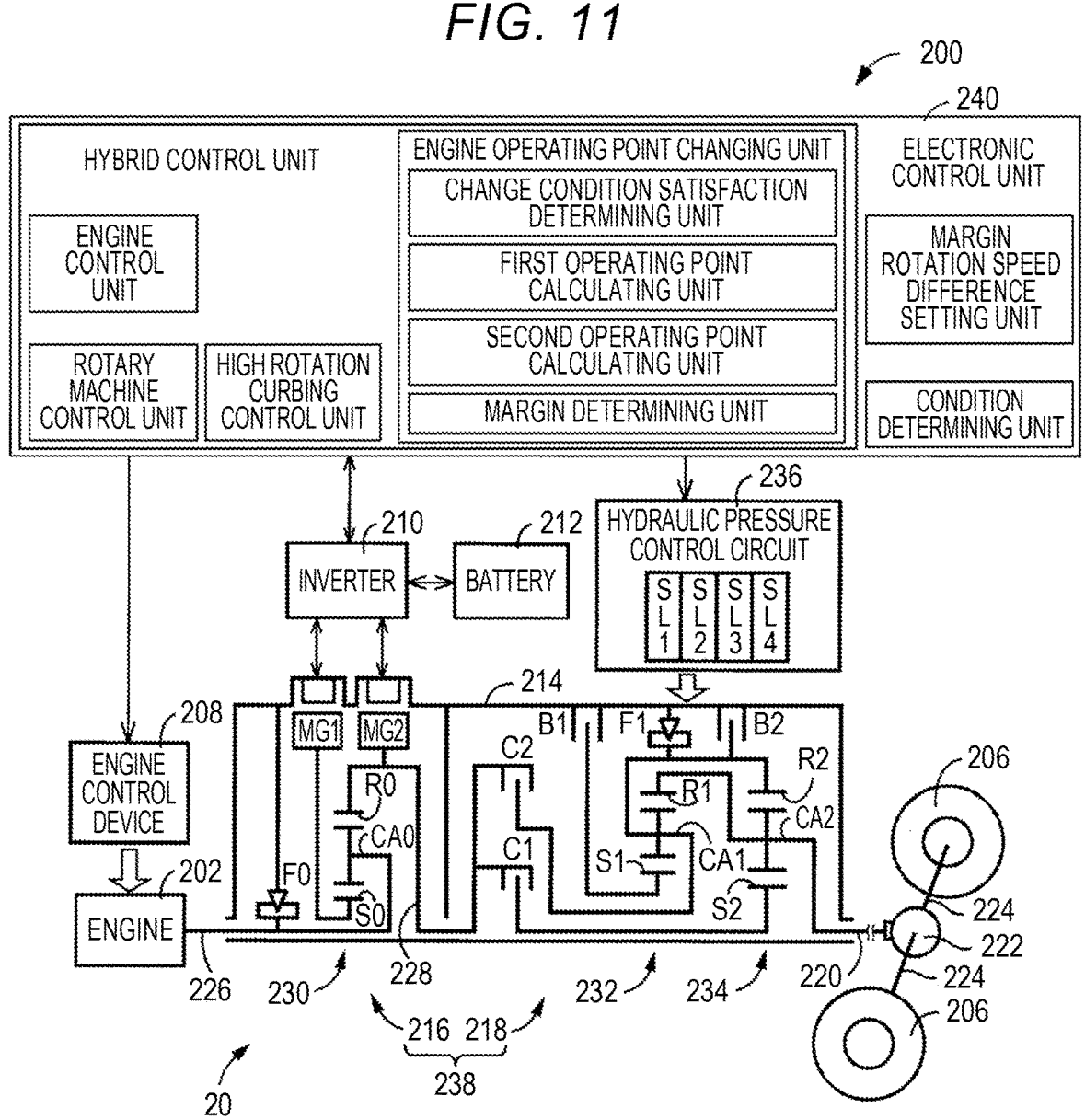
FIG. 11 is a diagram schematically illustrating a configuration of a vehicle to which the present disclosure is applied and which is different from the vehicle illustrated in FIG. 1.
FIG. 12 is an operation table illustrating a relationship between combinations of a gear shifting operation of a mechanical stepped gear shifting unit illustrated in FIG. 11 and operations of engagement devices which are used therein.

In this embodiment, a vehicle 200 which is different from the vehicle 10 described above in the first embodiment and which is illustrated in FIG. 11 is exemplified. FIG. 11 is a diagram schematically illustrating a configuration of a vehicle 200 to which the present disclosure is applied. In FIG. 11, the vehicle 200 is a hybrid vehicle including an engine 202, a first rotary machine (a rotary machine) MG1, a second rotary machine MG2, a power transmission device 204, driving wheels 206.

The engine 202, the first rotary machine MG1, and the second rotary machine MG2 have the same configurations as the engine 12, the first rotary machine MG1, and the second rotary machine MG2 described above in the first embodiment. An engine torque Te of the engine 202 is controlled by causing an electronic control unit 240 which will be described later to control an engine control device 208 including an electronic throttle valve, a fuel injection device, an ignition device, and a waste gate valve which are provided in the vehicle 200. The first rotary machine MG1 and the second rotary machine MG2 are connected to a battery 212 that is a power storage device provided in the vehicle 200 via an inverter 210 provided in the vehicle 200. An MG1 torque Tg and an MG2 torque Tm of the first rotary machine MG1 and the second rotary machine MG2 are controlled by causing the electronic control unit 240 to control the inverter 210.

A power transmission device 204 includes an electrical stepless gear shifting unit 216 and a mechanical stepped gear shifting unit 218 which are arranged in series on a common axis in a case 214 that is a non-rotary member attached to the vehicle body. The electrical stepless gear shifting unit 216 is connected to the engine 202 directly or indirectly via a damper which is not illustrated or the like. The mechanical stepped gear shifting unit 218 is connected to an output side of the electrical stepless gear shifting unit 216. The power transmission device 204 includes a differential gear unit 222 that is connected to an output shaft 220 which is an output rotary member of the mechanical stepped gear shifting unit 218 and a pair of axles 224 that is connected to the differential gear unit 222 or the like. In the power transmission device 204, power which is output from the engine 202 or the second rotary machine MG2 is transmitted to the mechanical stepped gear shifting unit 218 and is transmitted from the mechanical stepped gear shifting unit 218 to the driving wheels 206 via the differential gear unit 222 or the like. The power transmission device 204 having this configuration is suitably used for a vehicle of a front-engine rear-drive (FR) type. In the following description, the electrical stepless gear shifting unit 216 is referred to as a stepless gear shifting unit 216 and the mechanical stepped gear shifting unit 218 is referred to as a stepped gear shifting unit 218. The stepless gear shifting unit 216, the stepped gear shifting unit 218, or the like is disposed to be substantially symmetric with respect to the common axis, and a lower half with respect to the axis is not illustrated in FIG. 11. The common axis is an axis of a crankshaft of the engine 202, a connection shaft 226 connected to the crankshaft, or the like.

The stepless gear shifting unit 216 includes a differential mechanism 230 that is a power split mechanism that mechanically splits power of the engine 202 to the first rotary machine MG1 and an intermediate transmission member 228 which is an output rotary member of the stepless gear shifting unit 216. The first rotary machine MG1 is a rotary machine to which power of the engine 202 is transmitted. The second rotary machine MG2 is connected to the intermediate transmission member 228 in a power-transmittable manner. Since the intermediate transmission member 228 is connected to the driving wheels 206 via the stepped gear shifting unit 218, the second rotary machine MG2 is a rotary machine that is connected to the driving wheels 206 in a power-transmittable manner. The differential mechanism 230 is a differential mechanism that splits and transmits power of the engine 202 to the driving wheels 206 and the first rotary machine MG1. The stepless gear shifting unit 216 is an electrical stepless transmission in which a differential state of the differential mechanism 230 is controlled by controlling the operating state of the first rotary machine MG1. The first rotary machine MG1 is a rotary machine that can control an engine rotation speed Ne, that is, adjust the engine rotation speed Ne.

The differential mechanism 230 is constituted by a single-pinion type planetary gear unit and includes a sun gear S0, a carrier CA0, and a ring gear R0. The engine 202 is connected to the carrier CA0 via the connection shaft 226 in a power-transmittable manner, the first rotary machine MG1 is connected to the sun gear S0 in a power-transmittable manner, and the second rotary machine MG2 is connected to the ring gear R0 in a power-transmittable manner. In the differential mechanism 230, the carrier CA0 serves as an input element, the sun gear S0 serves as a reaction element, and the ring gear R0 serves as an output element.

The stepped gear shifting unit 218 is a stepped transmission constituting at least a part of a power transmission path between the intermediate transmission member 228 and the driving wheels 206, that is, a mechanical gear shifting mechanism constituting a part of a power transmission path between the stepless gear shifting unit 216 (which is synonymous with the differential mechanism 230) and the driving wheels 206. The intermediate transmission member 228 also serves as an input rotary member of the stepped gear shifting unit 218. The stepped gear shifting unit 218 is, for example, a known planetary gear type automatic transmission including a plurality of planetary gear units such as a first planetary gear unit 232 and a second planetary gear unit 234 and a plurality of engagement devices such as a one-way clutch F1, a clutch C1, a clutch C2, a brake B1, and a brake B2. In the following description, the clutch C1, the clutch C2, the brake B1, and the brake B2 are simply referred to as engagement devices CB when not particularly distinguished.

Each engagement device CB is a hydraulic frictional engagement device which is constituted by a multi-disc or single-disc clutch or brake which is pressed by a hydraulic actuator, a band brake which is tightened by a hydraulic actuator, and the like. The operating state such as an engaged state or a disengaged state of each engagement device CB is switched by changing an engagement torque Tcb which is a torque capacity thereof using regulated engagement oil pressures PRcb of the engagement devices CB which are output from solenoid valves SL1 to SL4 or the like in a hydraulic pressure control circuit 236 provided in the vehicle 200.

In the stepped gear shifting unit 218, rotary elements of the first planetary gear unit 232 and the second planetary gear unit 234 are partially connected to each other directly or indirectly via the engagement devices CB or the one-way clutch F1 or are connected to the intermediate transmission member 228, the case 214, or the output shaft 220. The rotary elements of the first planetary gear unit 232 are a first sun gear S1, a first carrier CA1, and a first ring gear R1, and the rotary elements of the second planetary gear unit 234 are a second sun gear S2, a second carrier CA2, and a second ring gear R2.

In the stepped gear shifting unit 218, one gear stage of a plurality of gear stages with different gear ratios γat (=AT input rotation speed Ni/AT output rotation speed Noat) is formed by engaging one of a plurality of engagement devices. In this embodiment, a gear stage which is formed in the stepped gear shifting unit 218 is referred to as an AT gear stage. The AT input rotation speed Ni is an input rotation speed of the stepped gear shifting unit 218 and has the same value as a rotation speed of the intermediate transmission member 228 and the same value as an MG2 rotation speed Nm. The AT output rotation speed Noat is a rotation speed of the output shaft 220 which is an output rotation speed of the stepped gear shifting unit 218 and is also an output rotation speed of a composite transmission (a transmission) 238 which is a combined transmission including the stepless gear shifting unit 216 and the stepped gear shifting unit 218. In the composite transmission 238, the stepless gear shifting unit 216 and the stepped gear shifting unit 218 can be controlled such that a gear ratio γtB (=Ne/Noat) indicating a value of a ratio of the engine rotation speed Ne to the output rotation speed Noat changes. The gear ratio γtB is a total gear ratio which is formed by the stepless gear shifting unit 216 and the stepped gear shifting unit 218 which are arranged in series and has a value obtained by multiplying the gear ratio γ0 of the stepless gear shifting unit 216 and the gear ratio γat of the stepped gear shifting unit 218 (γtB=γ0× γat). Here, γ0 is a value of a ratio of the engine rotation speed Ne to the MG2 rotation speed Nm (Ne/Nm). The composite transmission 238 is a transmission that is provided in a power transmission path between the engine 202 and the driving wheels 206.

In the stepped gear shifting unit 218, for example, as illustrated in an engagement operation table of FIG. 12, four forward AT gear stages including a first AT gear stage ("1st" in the drawing) to a fourth AT gear stage ("4th" in the drawing) are formed as a plurality of AT gear stages. The gear ratio γat of the first AT gear stage is the highest and the gear ratio γat becomes lower in a higher AT gear stage. A reverse AT gear stage ("Rev" in the drawing) is formed, for example, by engagement of the clutch C1 and engagement of the brake B2. That is, for example, the first AT gear stage is formed at the time of reverse travel. The engagement operation table illustrated in FIG. 12 is obtained by collecting relationships between the AT gear stages and the operation states of the plurality of engagement devices. In FIG. 12, "O" denotes engagement, "Δ" denotes engagement at the time of engine braking or at the time of coast downshift of the stepped gear shifting unit 218, and a blank denotes disengagement.

In the stepped gear shifting unit 218, an AT gear stage which is formed according to a driver's operation of an accelerator, a vehicle speed V, or the like is switched, that is, a plurality of AT gear stages are selectively formed, by an electronic control unit 240 which will be described later. For example, in gear shifting control of the stepped gear shifting unit 218, so-called clutch-to-clutch gear shifting in which gear shifting is performed by switching one of the engagement devices CB, that is, gear shifting is performed by switching of the engagement device CB between engagement and disengagement, is performed.

The vehicle 200 further includes an one-way clutch F0. The one-way clutch F0 is a lock mechanism that can fix the carrier CA0 in a non-rotatable manner. That is, the one-way clutch F0 is a lock mechanism that can fix the connection shaft 226 which is connected to the crankshaft of the engine 202 and which rotates integrally with the carrier CA0 to the case 214. In the one-way clutch F0, one member of two members rotatable relative to each other is integrally connected to the connection shaft 226 and the other member is integrally connected to the case 214. The one-way clutch F0 idles in a positive rotating direction which is a rotating direction at the time of operation of the engine 202 and is automatically engaged in a negative rotating direction which is opposite to that at the time of operation of the engine 202. Accordingly, at the time of idling of the one-way clutch F0, the engine 202 is rotatable relative to the case 214. On the other hand, at the time of engagement of the one-way clutch F0, the engine 202 is not rotatable relative to the case 214. That is, the engine 202 is fixed to the case 214 by engagement of the one-way clutch F0. In this way, the one-way clutch F0 permits rotation in the positive rotating direction of the carrier CA0 which is a rotating direction at the time of operation of the engine 202 and prohibits rotation in the negative rotating direction of the carrier CA0. That is, the one-way clutch F0 is a lock mechanism that can permit rotation in the positive rotating direction of the engine 202 and prohibit rotation in the negative rotating direction.

The vehicle 200 further includes an electronic control unit 240 which is a controller including a control device for the vehicle 200 associated with control of the engine 202, the first rotary machine MG1, the second rotary machine MG2, and the like. The electronic control unit 240 has the same configuration as the electronic control unit 100 described above in the first embodiment. The electronic control unit 240 is supplied with various signals which are the same as supplied to the electronic control unit 100. Various command signals which are the same as output from the electronic control unit 100 are output from the electronic control unit 240. The electronic control unit 240 has functions equivalent to the functions of the hybrid control unit 102, the margin rotation speed difference setting unit 114, and the condition determining unit 116 which are included in the electronic control unit 100. The electronic control unit 240 can realize a control function capable of preventing a high-rotation state in which the engine rotation speed Ne exceeds the maximum rotation speed Nemax, which is the same function as realized by the electronic control unit 100 described above in the first embodiment.

In the vehicle 200, the stepped gear shifting unit 218 is provided in series on the rear stage of the stepless gear shifting unit 216. Accordingly, when the AT gear stage of the stepped gear shifting unit 218 is switched at a certain vehicle speed V, the rotation speed of the ring gear R0 which is the output rotation speed of the stepless gear shifting unit 216 changes. Then, a feasible area of the engine rotation speed Ne changes based on a difference between the AT gear stages in the stepped gear shifting unit 218.

Figure 13:
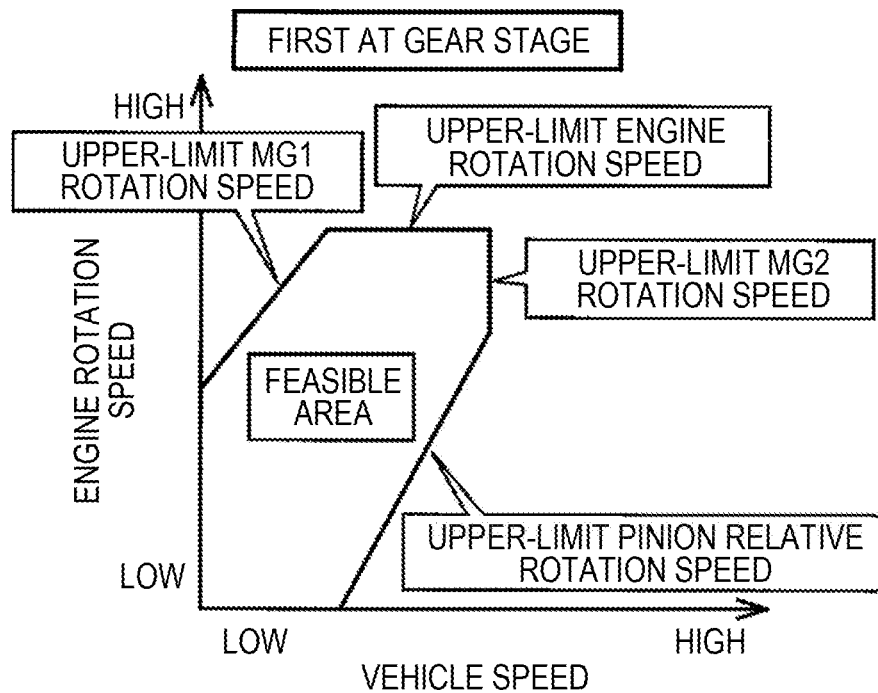
FIG. 13 is a diagram illustrating an example of a feasible area of an engine rotation speed in the vehicle illustrated in FIG. 11 at a first AT gear stage.
Figure 14:
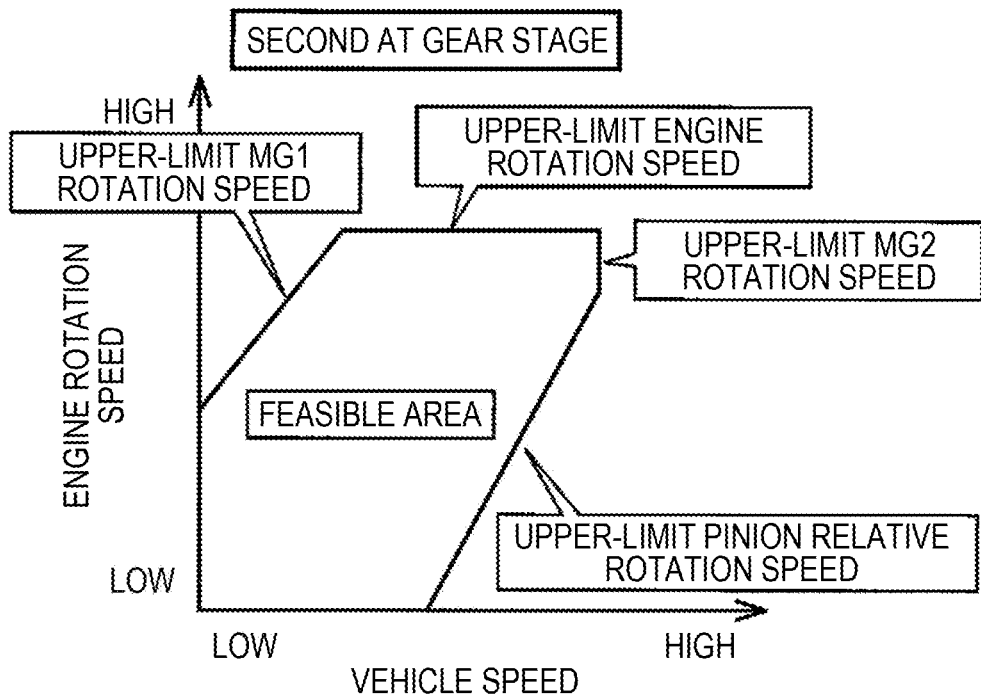
FIG. 14 is a diagram illustrating an example of a feasible area of an engine rotation speed in the vehicle illustrated in FIG. 11 at a second AT gear stage.
Figure 15:
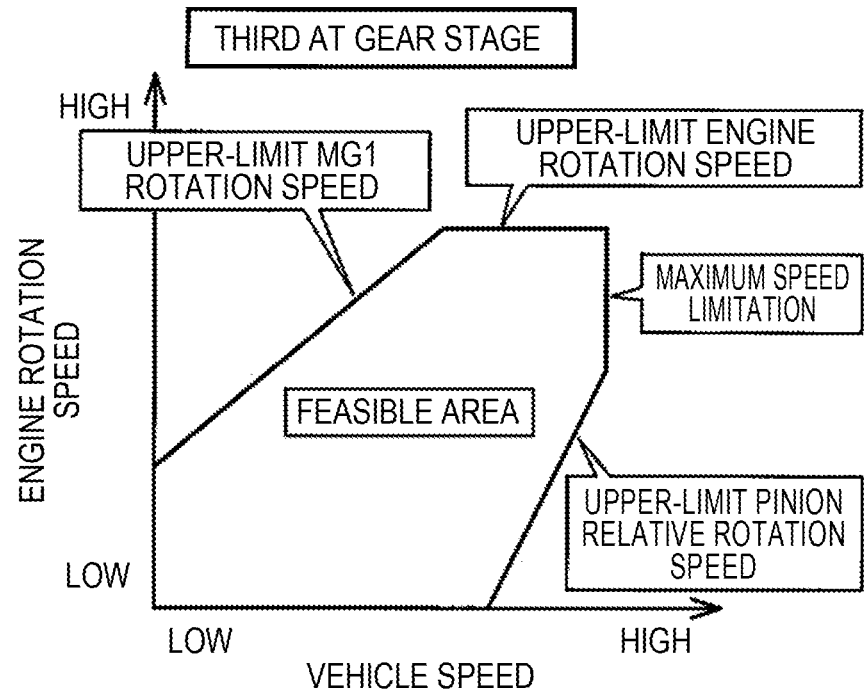
FIG. 15 is a diagram illustrating an example of a feasible area of an engine rotation speed in the vehicle illustrated in FIG. 11 at a third AT gear stage.
Figure 16:
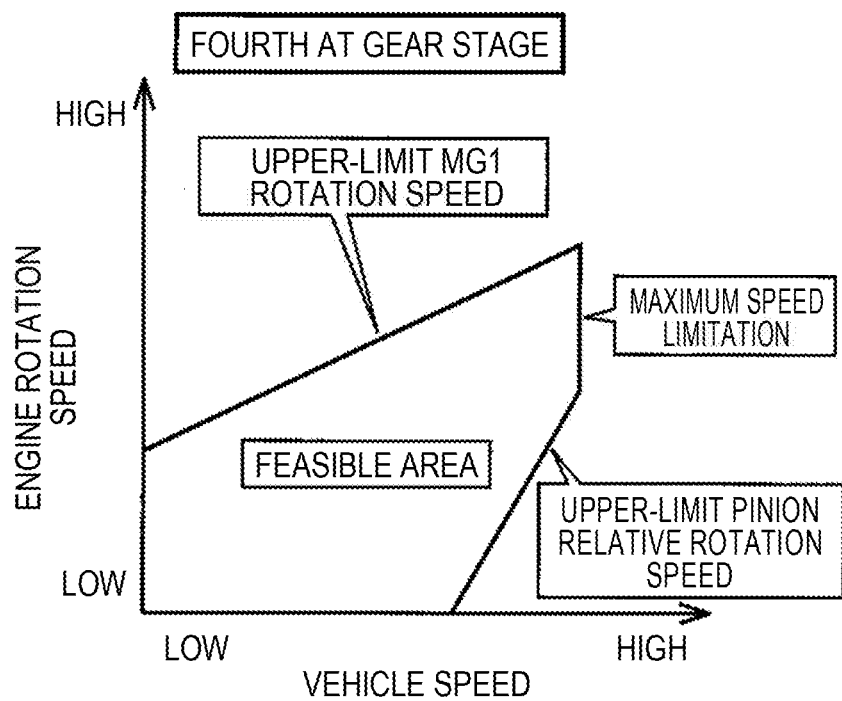
FIG. 16 is a diagram illustrating an example of a feasible area of an engine rotation speed in the vehicle illustrated in FIG. 11 at a fourth AT gear stage.

FIGS. 13, 14, 15, and 16 are diagrams illustrating an example of a feasible area of the engine rotation speed Ne on a two-dimensional coordinate system with the vehicle speed V and the engine rotation speed Ne as variables and illustrating an embodiment other than illustrated in FIG. 7 in the first embodiment. FIG. 13 illustrates a case in which the stepped gear shifting unit 218 is set to the first AT gear stage, FIG. 14 illustrates a case in which the stepped gear shifting unit 218 is set to the second AT gear stage, FIG. 15 illustrates a case in which the stepped gear shifting unit 218 is set to the third AT gear stage, and FIG. 16 illustrates a case in which the stepped gear shifting unit 218 is set to the fourth AT gear stage. In FIGS. 13, 14, 15, and 16, the basic idea for defining the feasible area of the engine rotation speed Ne is the same as described above with reference to FIG. 7. As the stepped gear shifting unit 218 is set to a higher AT gear stage at a certain vehicle speed V, the rotation speed of the ring gear R0 which is the output rotation speed of the stepless gear shifting unit 216 becomes lower. Accordingly, in a low area of the engine rotation speed Ne, the feasible area of the engine rotation speed Ne which is defined according to the upper limit of the relative rotation speed of the second pinion P2 is enlarged to a higher vehicle speed side at a higher AT gear stage. At the third AT gear stage or at the fourth AT gear stage, the rotation speed of the ring gear R0 decreases and thus the feasible area of the engine rotation speed Ne is not defined according to the upper-limit MG2 rotation speed Nmlim, but the feasible area of the engine rotation speed Ne is defined according to a maximum vehicle speed of the vehicle 200. When the AT gear stage of the stepped gear shifting unit 218 is on a high side and the rotation speed of the ring gear R0 decreases, the MG1 rotation speed Ng is likely to increase. Accordingly, in a low vehicle speed area, limitation on a high rotation side of the feasible area of the engine rotation speed Ne which is defined according to the upper-limit MG1 rotation speed Nglim increases as the AT gear stage becomes higher.

Figure 17:
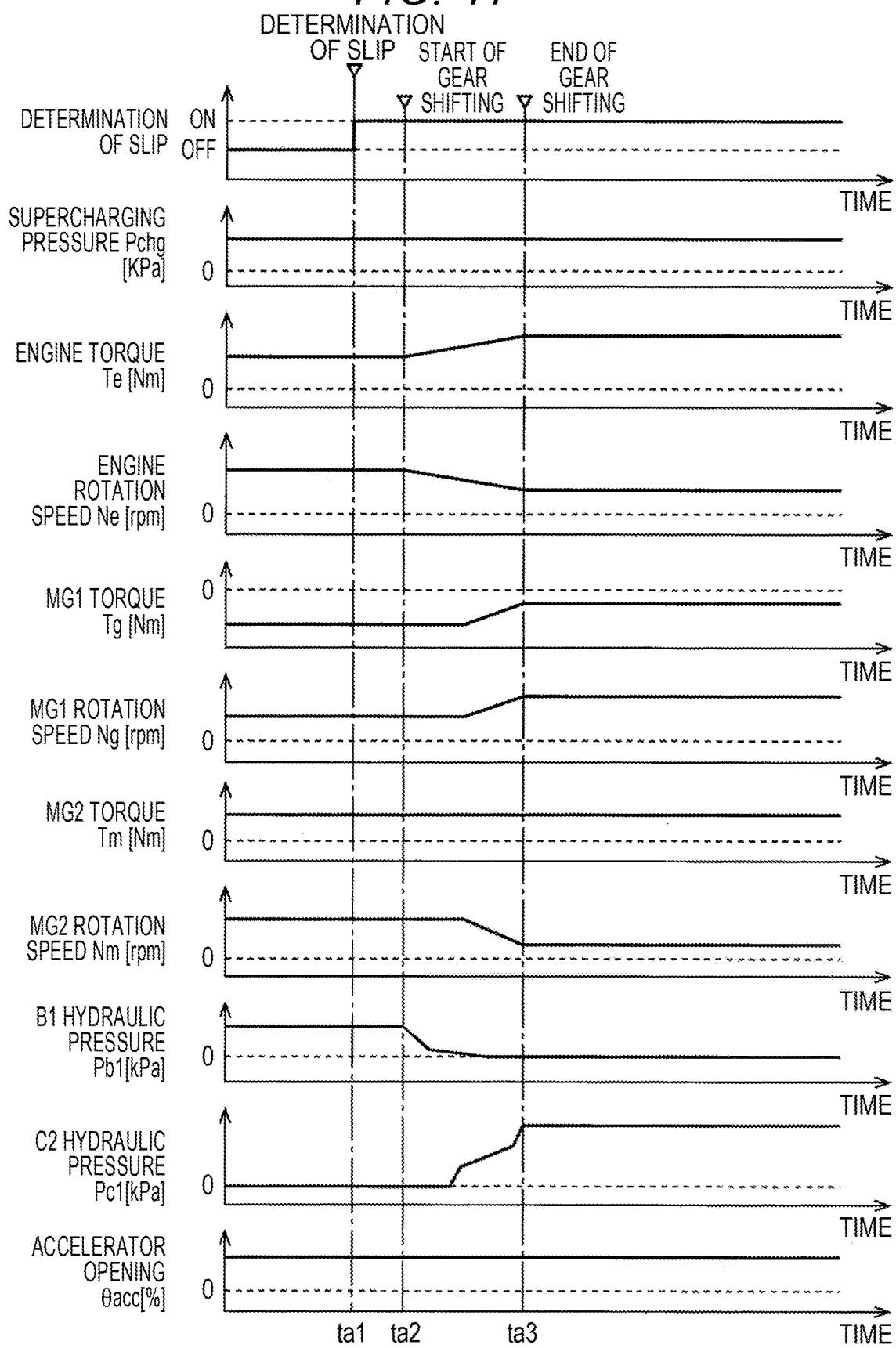
FIG. 17 is a diagram illustrating an example of a timing chart when the control operation illustrated in the flowchart of FIG. 9 is performed in the vehicle illustrated in FIG. 11.

FIG. 17 is a diagram illustrating an example of a timing chart when the control operation illustrated in the flowchart of FIG. 9 according to the first embodiment is performed in the vehicle 200. FIG. 17 is a diagram illustrating an example in which it is determined that the vehicle 200 is traveling on a road on which the driving wheels 206 are likely to slip due to slippage of the driving wheels 206 and the composite transmission 238 is caused to perform gear shifting to change the engine operating point OPeng. In FIG. 17, time point ta1 indicates a time point at which the driving wheels 206 slip and it is determined that the vehicle 200 is traveling on a road on which the driving wheels 206 are likely to slip (slip determination is performed). Time point ta2 indicates a time point at which the actual rotation speed difference $\Delta N$ becomes equal to or less than the margin rotation speed difference $\Delta Nr$ to satisfy the operating point change condition CD and gear shifting by the composite transmission 238 is started to change the engine operating point OPeng such that the actual rotation speed difference $\Delta N$ becomes greater than the margin rotation speed difference $\Delta Nr$. Time point ta3 indicates a time point at which gear shifting by the composite transmission 238 is ended. In this embodiment, when the actual rotation speed difference $\Delta N$ is equal to or less than the margin rotation speed difference $\Delta Nr$, the engine operating point OPeng is changed such that the actual rotation speed difference $\Delta N$ becomes greater than the margin rotation speed difference $\Delta Nr$. Accordingly, in this embodiment since a relatively sufficient margin is secured between the maximum rotation speed Nemax and the engine rotation speed Ne, it is possible to achieve the same advantage as in the first embodiment of preventing the engine rotation speed Ne from falling into a high-rotation state in which the engine rotation speed Ne exceeds the maximum rotation speed Nemax.

Figure 18:
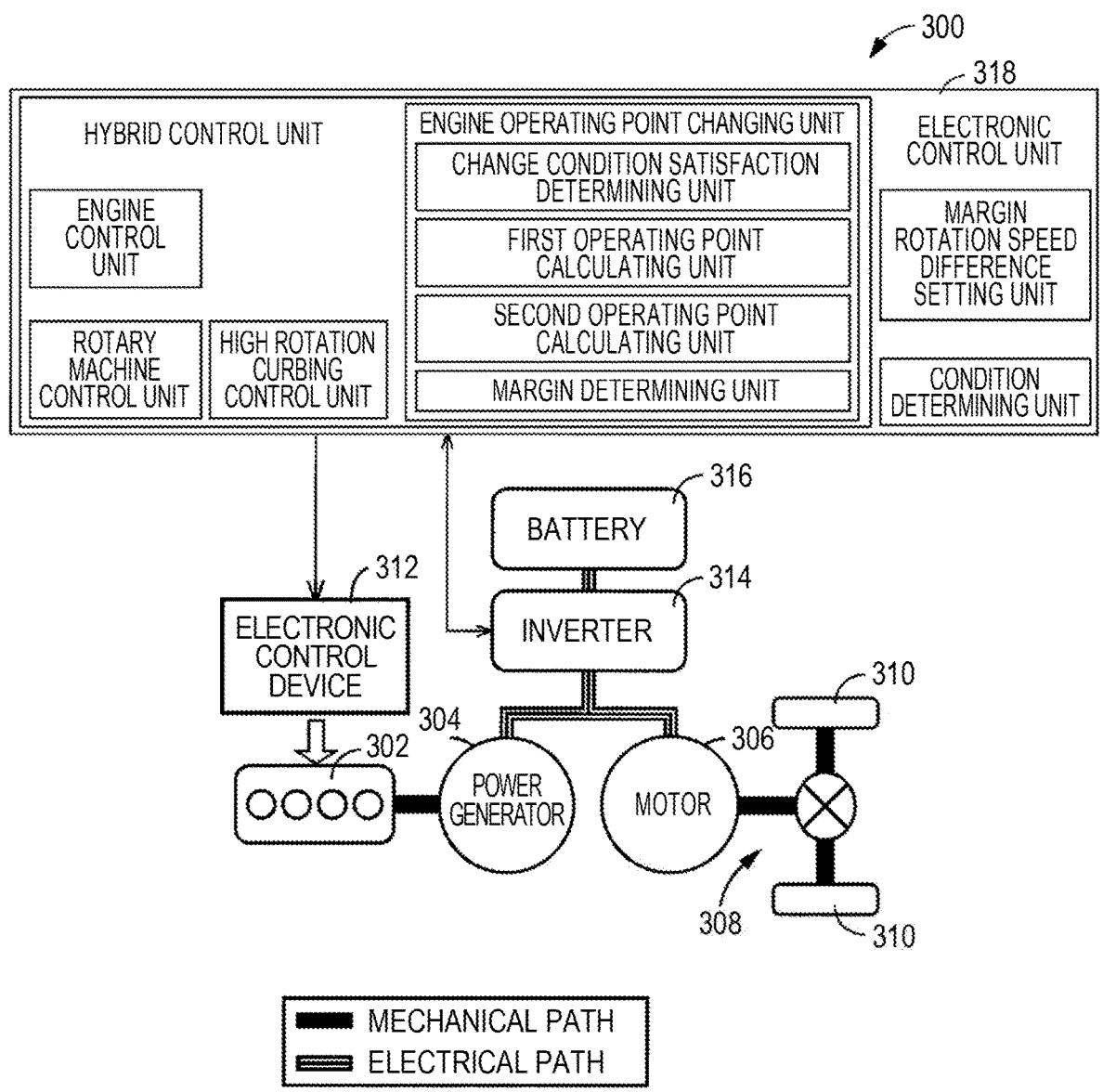
FIG. 18 is a diagram schematically illustrating a configuration of a vehicle to which the present disclosure is applied and which is different from the vehicle illustrated in FIGS. 1 and 12.

In this embodiment, a vehicle 300 which is different from the vehicle 10 described above in the first embodiment and which is illustrated in FIG. 18 is exemplified. FIG. 18 is a diagram schematically illustrating a configuration of a vehicle 300 to which the present disclosure is applied. In FIG. 18, the vehicle 300 is a series type hybrid vehicle including an engine 302, a power generator 304, a motor 306, a power transmission device 308, and driving wheels 310.

The engine 302 has the same configuration as the engine 12 described above in the first embodiment. An engine torque Te of the engine 302 is controlled by causing an electronic control unit 318 which will be described later to control an engine control device 312 such as an electronic throttle valve, a fuel injection device, an ignition device, and a waste gate valve which are provided in the vehicle 300. The engine 302 is not mechanically connected to the driving wheels 310.

The power generator 304 is a rotary electric machine that has only a function of a power generator. The power generator 304 is a first rotary machine (a rotary machine) that is mechanically connected to the engine 302 and to which power of the engine 302 is transmitted. The power generator 304 is rotationally driven by the engine 302 to generate electric power with power of the engine 302. The power generator 304 is a first rotary machine that can control the engine rotation speed Ne, that is, a first rotary machine that can adjust the engine rotation speed Ne. The motor 306 is a rotary electric machine having a function of an electric motor and a function of a power generator and is called a motor generator. The motor 306 is a second rotary machine that is connected to the driving wheels 310 via the power transmission device 308 in a power-transmittable manner. The power generator 304 and the motor 306 are connected to a battery 316 that is a power storage device provided in the vehicle 300 via an inverter 314 provided in the vehicle 300. In the power generator 304 and the motor 306, a generator torque Tgr which is an output torque of the power generator 304 and a motor torque Tmt which is an output torque of the motor 306 are controlled by causing the electronic control unit 318 to control the inverter 314. Generated electric power Wgr of the power generator 304 is charged in the battery 316 or is consumed in the motor 306. The motor 306 outputs the motor torque Tmt using all or some of the generated electric power Wgr or using electric power from the battery 316 in addition to the generated electric power Wgr. In this way, the motor 306 is driven with the generated electric power Wgr of the power generator 304.

The vehicle 300 further includes an electronic control unit 318 which is a controller including a control device for the vehicle 300 associated with control of the engine 302, the power generator 304, the motor 306, and the like. The electronic control unit 318 has the same configuration as the electronic control unit 100 described above in the first embodiment. The electronic control unit 318 is supplied with various signals which are the same as supplied to the electronic control unit 100. Various command signals which are the same as output from the electronic control unit 100 are output from the electronic control unit 318. The electronic control unit 318 has functions equivalent to the functions of the hybrid control unit 102, the margin rotation speed difference setting unit 114, and the condition determining unit 116 which are included in the electronic control unit 100. The electronic control unit 318 can realize a control function capable of preventing the engine rotation speed Ne from falling into a high-rotation state in which the engine rotation speed Ne exceeds the maximum rotation speed Nemax which is the same function as realized by the electronic control unit 100 described above in the first embodiments.

In the vehicle 300, since the engine 302 is not mechanically connected to the driving wheels 310, a phenomenon in which the engine rotation speed Ne increases due to idling of the driving wheels 310 does not occur. On the other hand, when the power generator 304 is subjected to the predetermined output limitation, control of the power generator 304 for causing the engine rotation speed Ne to reach the target engine rotation speed Netgt may not be appropriately performed and the engine rotation speed Ne is likely to increase. Accordingly, in the vehicle 300, whether the vehicle 300 is traveling on a road on which the driving wheels 310 are likely to slip is not considered but whether the power generator 304 is subjected to the predetermined output limitation is considered in order to determine whether the vehicle condition is the predetermined vehicle condition in which the engine rotation speed Ne is likely to exceed the maximum rotation speed Nemax.

While embodiments of the present disclosure have been described above with reference to the accompanying drawings, the present disclosure may be applied to other aspects.

For example, in the first embodiment, the condition determining unit 116 determines whether the vehicle condition is the predetermined vehicle condition based on whether the vehicle 10 is traveling on a road on which the driving wheels 16 are likely to slip. For example, the condition determining unit 116 may determine whether the vehicle condition is the predetermined vehicle condition based on whether the first rotary machine MG1 is subjected to a predetermined output limitation. The predetermined output limitation is, for example, an output limitation with which power generation or powering by the first rotary machine MG1 at the time of outputting of the MG1 torque Tg which is a reaction torque of the engine torque Te cannot be appropriately performed. When the first rotary machine MG1 is subjected to the predetermined output limitation, control of the first rotary machine MG1 for causing the engine rotation speed Ne to reach the target engine rotation speed Netgt may not be appropriately performed and the engine rotation speed Ne is likely to increase. Examples of the output limitation with which power generation or powering by the first rotary machine MG1 cannot be appropriately performed include a state in which the temperature of the first rotary machine MG1 is high or low such that the MG1 temperature THg departs from a predetermined normal temperature area THgra and a state in which the temperature of the battery 54 is high or low such that the battery temperature THbat departs from a predetermined normal temperature area THbatra. The predetermined normal temperature area THgra is a normal use area of the first rotary machine MG1 and is a predetermined temperature area of the first rotary machine MG1 in which the output of the first rotary machine MG1 does not decrease according to the MG1 temperature THg. The predetermined normal temperature area THbatra is a normal use area of the battery 54 and is a predetermined temperature area of the battery 54 in which the chargeable and dischargeable powers Win and Wout do not decrease according to the battery temperature THbat. With the electronic control unit 100 including the condition determining unit 116, it is possible to appropriately prevent the engine rotation speed Ne from falling into a high-rotation state in which the engine rotation speed Ne exceeds the maximum rotation speed Nemax when the first rotary machine MG1 is subjected to the predetermined output limitation. When the condition determining unit 116 determines whether the vehicle condition is the predetermined vehicle condition based on whether the first rotary machine MG1 is subjected to the predetermined output limitation, for example, a margin rotation speed difference setting map in which the margin rotation speed difference ΔNr is set to increase as the MG1 temperature THg departs farther from the predetermined normal temperature area THgra or as the battery temperature THbat departs farther from the predetermined normal temperature area THbatra may be used instead of the margin rotation speed difference setting map illustrated in FIG. 8 at the time of setting the margin rotation speed difference ΔNr.

For example, in the first embodiment, the condition determining unit 116 determines whether the vehicle condition is the predetermined vehicle condition based on whether the vehicle 10 is traveling on a road on which the driving wheels 16 are likely to slip. For example, the condition determining unit 116 may determine whether the vehicle condition is the predetermined vehicle condition based on whether the vehicle 10 is traveling on a road on which the driving wheels 16 are likely to slip and whether the first rotary machine MG1 is subjected to a predetermined output limitation. When at least one of the condition that the vehicle 10 is traveling on a road on which the driving wheels 16 are likely to slip and the condition that the first rotary machine MG1 is subjected to the predetermined output limitation is satisfied, the condition determining unit 116 is configured to determine that the vehicle condition is the predetermined vehicle condition.

In the change condition satisfaction determining unit 112*a* according to the first embodiment, the operating point change condition CD is satisfied when both a first condition CD1 and a second condition CD2 are satisfied. However, the operating point change condition CD may be satisfied when only the second condition CD2 is satisfied. That is, the operating point change condition CD may be satisfied when the actual rotation speed difference ΔN is equal to or less than the margin rotation speed difference ΔNr regardless of whether the vehicle condition is the predetermined vehicle condition which is determined by the condition determining unit 116.

In the margin rotation speed difference setting unit 114 according to the first embodiment, the margin rotation speed difference ΔNr is appropriately set, for example, using a margin rotation speed difference setting map illustrated in FIG. 8, but, for example, a preset one margin rotation speed difference ΔNr may be normally used.

In the margin determining unit 112*d* according to the first embodiment, the relative rotation speed Np2 of the second pinion P2 is used as an example of the rotation speed of the other rotary element. For example, in the margin determining unit 112*d*, a rotation speed of another rotary element such as the MG1 rotation speed Ng or the MG2 rotation speed Nm may be used instead of the relative rotation speed Np2 of the second pinion P2.

In the second operating point calculating unit 112*c* according to the first embodiment, the second target engine operating point OPengtgt2 is calculated such that the margin between the engine rotation speed Ne and the maximum rotation speed Nemax is equal to the margin between the relative rotation speed Np2 of the second pinion P2 and the maximum rotation speed Np2max. For example, the second target engine operating point OPengtgt2 may be calculated such that the margin between the engine rotation speed Ne and the maximum rotation speed Nemax is not equal to the margin between the relative rotation speed Np2 of the second pinion P2 and the maximum rotation speed Np2max, for example, the margin between the engine rotation speed Ne and the maximum rotation speed Nemax is two times or half times the margin between the relative rotation speed Np2 of the second pinion P2 and the maximum rotation speed Np2max. That is, a ratio of the margin between the engine rotation speed Ne and the maximum rotation speed Nemax to the margin between the relative rotation speed Np2 of the second pinion P2 and the maximum rotation speed Np2max at the second target engine operating point OPengtgt2 may be appropriately changed.

In the second embodiment, the condition determining unit 116 determines whether the vehicle condition is the predetermined vehicle condition based on whether the vehicle 200 is traveling on a road on which the driving wheels 206 are likely to slip. For example, the condition determining unit 116 may determine whether the vehicle condition is the predetermined vehicle condition based on whether the stepped gear shifting unit 218 which is an automatic transmission is subjected to a gear stage limitation. The gear stage limitation refers to limiting the gear stage of the stepped gear shifting unit 218 to a low gear stage such that the temperature of an oil which is used for the stepped gear shifting unit 218 increases by increasing the rotation speed of an intermediate transmission member 228 which is an input rotary member of the stepped gear shifting unit 218 when the oil temperature is low. When the oil temperature is low, controllability of gear shifting control which is performed in the stepped gear shifting unit 218 deteriorates. When the stepped gear shifting unit 218 is subjected to the gear stage limitation, the gear stage of the stepped gear shifting unit 218 is limited to a low gear stage and thus the engine rotation speed Ne is likely to increase.

In the first embodiment, the vehicle 10 may be a vehicle which does not include the gear shifting unit 58 and in which the engine 12 is connected to the differential unit 60 like the vehicle 200. The differential unit 60 may be a mechanism in which a differential operation can be limited by control of a clutch or brake connected to the rotary elements of the second planetary gear mechanism 82. The second planetary gear mechanism 82 may be a double pinion type planetary gear unit. The second planetary gear mechanism 82 may be a differential mechanism including four or more rotary elements by connection between a plurality of planetary gear units. The second planetary gear mechanism 82 may be a differential gear mechanism in which the first rotary machine MG1 and the drive gear 74 are connected to the pinion which is rotationally driven by the engine 12 and a pair of bevel gears engaging with the pinion, respectively. The second planetary gear mechanism 82 may be a mechanism with a configuration in which some rotary elements of two or more planetary gear units are connected to each other and the engine, the rotary machine, and the driving wheels are connected to the rotary elements of such planetary gear units in a power-transmittable manner.

In the second embodiment, the one-way clutch F0 is exemplified as a lock mechanism that can fix the carrier CA0 in a non-rotatable manner, but an applicable embodiment of the present disclosure is not limited to the aspect. This lock mechanism may be an engagement device such as an engaging clutch, a hydraulic frictional engagement device such as a clutch or a brake, a dry engagement device, an electromagnetic frictional engagement device, or a magnetic powder type clutch which selectively connects the connection shaft 226 and the case 214. Alternatively, the vehicle 200 does not have to include the one-way clutch F0.

In the second embodiment, the stepped gear shifting unit 218 is exemplified above as the automatic transmission constituting a part of the power transmission path between the differential mechanism 230 and the driving wheels 206, but an applicable embodiment of the present disclosure is not limited to the aspect. The automatic transmission may be an automatic transmission such as a synchromesh parallel biaxial automatic transmission, a known dual clutch transmission (DCT) with two input shafts as the synchromesh parallel biaxial automatic transmission, or a known belt type stepless transmission.

In the third embodiment, the engine 302 of the vehicle 300 is not mechanically coupled to the driving wheels 310, but an applicable embodiment of the present disclosure is not limited to this aspect. For example, the vehicle 300 may employ a configuration in which the engine 302 and the driving wheels 310 are connected to each other via a clutch and power of the engine 302 may be mechanically transmitted to the driving wheels 310, for example, by engaging the clutch at the time of travel at a high speed. The power transmission device 308 may include an automatic transmission.

In the first embodiment described above, a mechanical pump type supercharger that is rotationally driven by an engine or an electric motor may be provided in addition to the exhaust turbine type supercharger 18.

The above-mentioned embodiments are merely exemplary and the present disclosure can be embodied in various aspects which have been subjected to various modifications and improvements based on knowledge of those skilled in the art.

What is claimed is:

1. A control device for a hybrid vehicle including an engine with a supercharger and a rotary machine that is able to adjust a rotation speed of the engine, the control device comprising:
    a high rotation curbing control unit configured to control the engine and the rotary machine such that an operating point of the engine reaches a target operating point which is set such that the rotation speed of the engine is within a range which does not exceed a maximum rotation speed with a margin of the rotation speed of the engine from a predetermined upper-limit rotation speed of each of the engine and the rotary machine and an output required for the engine is output from the engine and to control the engine such that an output torque of the engine decreases when the rotation speed of the engine exceeds the maximum rotation speed; and
    an engine operating point changing unit configured to change the operating point of the engine such that a speed difference between the maximum rotation speed and the rotation speed of the engine becomes greater than a set margin speed difference when the speed difference becomes equal to or less than the margin speed difference.

2. The control device for a hybrid vehicle according to claim 1, further comprising a margin speed difference setting unit configured to set the margin speed difference to a greater value when a supercharging pressure from the supercharger is high than when the supercharging pressure is low.

3. The control device for a hybrid vehicle according to claim 2, wherein the margin speed difference setting unit is configured to set the margin speed difference to a greater value as the supercharging pressure becomes higher.

4. The control device for a hybrid vehicle according to claim 1, further comprising a condition determining unit configured to determine whether a vehicle condition is a predetermined vehicle condition in which the rotation speed of the engine is likely to exceed the maximum rotation speed,
    wherein the engine operating point changing unit is configured to change the operating point of the engine such that the speed difference is greater than the margin speed difference when it is determined that the vehicle condition is the predetermined vehicle condition and the speed difference is equal to or less than the margin speed difference.

5. The control device for a hybrid vehicle according to claim 4, wherein the condition determining unit is configured to determine whether the vehicle condition is the predetermined vehicle condition based on whether the hybrid vehicle is traveling on a road on which driving wheels to which power of the engine is transmitted are likely to slip.

6. The control device for a hybrid vehicle according to claim 4, wherein the condition determining unit is configured to determine whether the vehicle condition is the predetermined vehicle condition based on whether the rotary machine is subjected to a predetermined output limitation.

7. The control device for a hybrid vehicle according to claim 6, wherein the hybrid vehicle includes the engine as a drive power source and includes a transmission that is provided in a power transmission path between the engine and driving wheels, and
    wherein the engine operating point changing unit is configured to change the operating point of the engine by adjusting a rotation speed of the rotary machine and a gear ratio of the transmission.

* * * * *